United States Patent
Ostadabbas et al.

(10) Patent No.: US 11,222,437 B2
(45) Date of Patent: Jan. 11, 2022

(54) METHODS AND SYSTEMS FOR IN-BED POSE ESTIMATION

(71) Applicant: Northeastern University, Boston, MA (US)

(72) Inventors: Sarah Ostadabbas, Boston, MA (US); Shuangjun Liu, Boston, MA (US)

(73) Assignee: Northeastern University, Boston, MA (US)

( * ) Notice: Subject to any disclaimer, the term of this patent is extended or adjusted under 35 U.S.C. 154(b) by 44 days.

(21) Appl. No.: 16/778,459

(22) Filed: Jan. 31, 2020

(65) Prior Publication Data
US 2020/0265602 A1 Aug. 20, 2020

Related U.S. Application Data

(60) Provisional application No. 62/806,270, filed on Feb. 15, 2019.

(51) Int. Cl.
G06T 7/70 (2017.01)
G06T 7/20 (2017.01)
H04N 5/247 (2006.01)

(52) U.S. Cl.
CPC ............ *G06T 7/70* (2017.01); *G06T 7/20* (2013.01); *G06T 2207/10048* (2013.01); *G06T 2207/20081* (2013.01); *G06T 2207/30196* (2013.01); *H04N 5/247* (2013.01)

(58) Field of Classification Search
None
See application file for complete search history.

(56) References Cited

U.S. PATENT DOCUMENTS

| | | | | |
|---|---|---|---|---|
| 6,049,281 | A * | 4/2000 | Osterweil | A61B 5/1128 340/573.1 |
| 2014/0267625 | A1* | 9/2014 | Clark | A61B 5/1115 348/46 |
| 2017/0372483 | A1* | 12/2017 | Chronis | G06T 7/11 |

OTHER PUBLICATIONS

Abouzari et al., "The Role of Postoperative Patient Posture in the Recurrence of Traumatic Chronic Subdural Hematoma After Burr-Hole Surgery," Neuro-surgery, 61(4):794-797 (2007).
Achilles et al., "Patient MoCap: Human Pose Estimation Under Blanket Occlusion for Hospital Monitoring Applications," International Conference on Medical Image Computing and Computer-Assisted Intervention, pp. 491-499. Springer (2016).
Andriluka et al., "2D Human Pose Estimation: New benchmark and State of the Art Analysis," Proceedings of the IEEE Conference on Computer Vision and Pattern Recognition, pp. 3686-3693 (2014).

(Continued)

*Primary Examiner* — Leon Flores
(74) *Attorney, Agent, or Firm* — Foley Hoag LLP; Dana M. Gordon; Rajesh Vallabh

(57) ABSTRACT

Non-contact methods and systems are disclosed for estimating an in-bed human pose. The method includes the steps of: (a) capturing thermal imaging data of a human subject lying on a bed using a long wavelength infrared camera positioned above the human subject; (b) transmitting the thermal imaging data to a computer system; and (c) processing the thermal imaging data by the computer system using a model to estimate the pose of the human subject, the model comprising a machine learning inference model trained on a training dataset of a plurality of in-bed human poses.

16 Claims, 15 Drawing Sheets

(56) References Cited

OTHER PUBLICATIONS

Atkinson et al., "Relationships between sleep, physical activity and human health," Physiology & behavior, 90(2-3):229-235 (2007).

Bishop et al., "Neural Networks for Pattern Recognition," Oxford University Press (1995).

Black et al., "National Pressure Ulcer Advisory Panel's Updated Pressure Ulcer Staging System," Urologic Nursing, 27(2):144-150 (2007).

Body Pressure Measurement System (BPMS). "Pressure Mapping, Force Measurement & Tactile Sensors." https://www.tekscan.com/products-solutions/systems/body-pressure-measurement-system-bpms. (2018).

Caesar et al., "COCO-Stuff: Thing and Stuff Classes in Context," CoRR, abs/1612.03716, pp. 1209-1218 (2016).

Chen et al., "Patient-Specific Pose Estimation in Clinical Environments," IEEE Journal of Translational Engineering in Health and Medicine, V6, (2018).

Chu et al., "Multi-Context Attention for Human Pose Estimation," arXiv preprint arXiv:1702.07432, 1(2):1831-1840 (2017).

Dalal et al., "Histograms of Oriented Gradients for Human Detection," 2005 IEEE Computer Society Conference on Computer Vision and Pattern Recognition (CVPR'05), 1:886-893 (2005).

Ding, "Bed Status Detection for Elder-care Center," In 2009 16th International Conference on Systems, Signals and Image Processing, pp. 1-4. IEEE (2009).

Fowlkes et al., "Mechanical Bioeffects from Diagnostic Ultrasound: AIUM Consensus Statements," American Institute of Ultrasound in Medicine. Journal of Ultrasound in Medicine, 19(2):69-72 (2000).

Hartley et al., "Multiple View Geometry in Computer Vision," Cambridge University Press, ISBN: 0521540518, second edition, pp. 25-64 (2004).

Heydarzadeh et al., "In-Bed Posture Classification Using Deep Autoencoders," Engineering in Medicine and Biology Society (EMBC), 2016 IEEE 38th Annual International Conference, pp. 3839-3842. IEEE (2016).

Johnson et al., "Clustered Pose and Nonlinear Appearance Models for Human Pose Estimation," BMVC, 2(5):1-11 (2010).

Kondepudi et al., "Introduction to Modern Thermodynamics: From Heat Engines to Dissipative Structures," John Wiley & Sons (2014).

LeCun et al., "Deep learning," Nature, 521(7553):436-444 (2015).

Lee et al., "Changes in Site of Obstruction in Obstructive Sleep Apnea Patients According to Sleep Position: a DISE Study," The Laryngoscope, 125(1):248-254 (2015).

Lee, "Theoretical Prediction and Measurement of the Fabric Surface Apparent Temperature in a Simulated Man/Fabric/Environment System," Technical report, Defence Science And Technology Organisation Melbourne (Australia) (1999).

Liu et al., "Body-Part Localization for Pressure Ulcer Prevention," 2014 36th Annual International Conference of the IEEE Engineering in Medicine and Biology Society, pp. 766-769 (2014).

Liu et al., "In-Bed Pose Estimation: Deep Learning with Shallow Dataset," arXiv preprint arXiv:1711.01005, 2017. IEEE Journal of Translations Engineering in Health and Medicine. V7 (2019).

Liu et al., "Inner Space Preserving Generative Pose Machine," Proceedings of the European Conference on Computer Vision (ECCV), pp. 718-735 (2018).

Liu et al., "Seeing Under the Cover: A Physics Guided Learning Approach for In-Bed Pose Estimation," MICCAI 2019, Shenzhen, China, Oct. 13-17, (2019).

Lowe, "Distinctive Image Features from Scale Invariant Keypoints," International journal of computer vision, 60(2):91-110 (2004).

Luo et al., "Color Object Detection Using Spatial Color Joint Probability Functions," IEEE Transactions on Image Processing, 15(6):1443-1453 (2006).

Martinez et al., "Action Recognition in Bed using BAMS for Assisted Living and Elderly Care," Machine Vision Applications (MVA), 2015 14th IAPR International Conference, pp. 329-332. IEEE (2015).

Martinez et al., "BAM! Depth-based Body Analysis in Critical Care," International Conference on Computer Analysis of Images and Patterns, pp. 465-472. Springer (2013).

McCabe et al., "Evaluation of sleep position as a potential cause of carpal tunnel syndrome: preferred sleep position on the side is associated with age and gender," Hand, 5(4):361-363 (2010).

McCabe et al., "Preferred sleep position on the side is associated with carpal tunnel syndrome," Hand, 6(2):132-137 (2011).

Newell et al., "Stacked Hourglass Networks for Human Pose Estimation." European Conference on Computer Vision, pp. 483-499. Springer (2016).

Oksenberg et al., "The effect of body posture on sleep-related breathing disorders: facts and therapeutic implications," Sleep medicine reviews, 2(3):139-162 (1998).

Ostadabbas et al., "In-Bed Posture Classification and Limb Identification," 2014 IEEE Biomedical Circuits and Systems Conference (BioCAS) Proceedings, pp. 133-136 (2014).

Ostadabbas, "SLP Dataset for Multimodal In-Bed Pose Estimation," https://web.northeastern.edu/ostadabbas/2019/06/27/multimodal-in-bed-pose-estimation/.

Pouyan et al., "Continuous Eight-Posture Classification for Bed-bound Patients," 2013 6th International Conference on Biomedical Engineering and Informatics, pp. 121-126 (2013).

Sheiner et al., "A comparison between acoustic output indices in 2D and 3D/4D ultrasound in obstetrics," Ultrasound in Obstetrics and Gynecology: The Official Journal of the International Society of Ultrasound in Obstetrics and Gynecology, 29(3):326-328 (2007).

Szeliski et al., "Creating Full View Panoramic Image Mosaics and Environment Maps," Proceedings of the 24th annual conference on Computer graphics and interactive techniques, pp. 251-258. ACM Press/Addison-Wesley Publishing Co. (1997).

Szeliski, "Computer Vision: Algorithms and Applications," Springer Science & Business Media (2010).

Tang et al., "Deeply Learned Compositional Models for Human Pose Estimation," The European Conference on Computer Vision (ECCV) (2018).

Wei et al., "Convolutional Pose Machines," Proceedings of the IEEE Conference on Computer Vision and Pattern Recognition, pp. 4724-4732 (2016).

Xiang et al., "Image Stitching with Perspective-Preserving Warping," arXiv preprint arXiv:1605.05019 (2016).

Xu et al., "On-bed Sleep Posture Recognition Based on Body-Earth Mover's Distance," Biomedical Circuits and Systems Conference (BioCAS), 2015 IEEE, pp. 1-4 (2015).

Yu et al., "Multiparameter Sleep Monitoring Using a Depth Camera," International Joint Conference on Biomedical Engineering Systems and Technologies, pp. 311-325. Springer (2012).

* cited by examiner

METHODS AND SYSTEMS FOR IN-BED POSE ESTIMATION

CROSS REFERENCE TO RELATED APPLICATIONS

This application claims priority from U.S. Provisional Patent Application No. 62/806,270 filed on Feb. 15, 2019 entitled IN-BED POSE ESTIMATION USING UNDER COVER IMAGING VIA THERMAL DIFFUSION, which is hereby incorporated by reference.

STATEMENT AS TO FEDERALLY SPONSORED RESEARCH

This invention was made with government support under Grant Number 1755695 awarded by the National Science Foundation. The government has certain rights in the invention.

BACKGROUND

The poses that we take while sleeping carry important information about our physical, physiological, and mental health evident in continuing research in sleep monitoring domain [4, 35]. These studies reveals that sleeping poses affect the symptoms of many complications such as sleep apnea [23], pressure ulcers [6], and even carpal tunnel syndrome [32, 33]. Moreover, patients in hospitals are usually required to maintain specific poses after certain surgeries to get a better recovery result. Therefore, long-term monitoring and automatically detecting in-bed poses are of critical interest in healthcare [1]. Currently, besides self-report obtained from the patients and/or visual inspection by the caregivers, in-bed pose estimation methods mainly rely on the use of pressure mapping (PM) systems. Authors in [37] extracted binary signatures from pressure images obtained from a commercial pressure mat and used a binary pattern matching technique for pose classification. The same group also introduced a Gaussian mixture model (GMM) clustering approach for concurrent pose classification and limb identification using pressure data [36]. In parallel, authors in [25] used pictorial structure model of the body based on both appearance and spatial information to localize the body parts within pressure images. Although PM-based methods are effective at localizing areas of increased pressure and even automatically classifying overall postures [36], the pressure sensing mats are expensive and require frequent maintenance. These obstacles have prevented pressure-based pose monitoring solutions from achieving large-scale popularity.

By contrast, camera-based vision methods for human pose estimation show great advantages including their low cost, and ease of maintenance. General purpose human pose estimation has become an active area in computer vision and surveillance research. Since the introduction of the convolutional pose machine (CPM) [42] in late 2016, the human pose estimation field has observed significant advancements in accuracy and robustness including models such as stacked hourglass network [34], multi-person pose estimation using part affinity [10], and deeply learned compositional model [41]. It is sensible to assume that deep learning models trained on existing datasets of various human poses should be able to address in-bed pose estimation problem as well. However, it turned out that when it comes to pose monitoring and estimation from individual in sleeping positions, there are significant distinctions between the two problems. Since in-bed pose estimation is often based on a long-term monitoring scenario, there will be notable differences in lighting conditions throughout a day (with no light during sleep time), which makes it challenging to keep uniform image quality via classical methods [27]. Moreover, people usually sleep while covered with a sheet or a blanket, which hinders the use of pose models trained on RGB datasets for in-bed pose estimation.

Using vision-based methods for in-bed activity monitoring, some groups exclusively focus on detection particular sparse actions such as leaving or getting into a bed [12]. Martinez et al. proposed a bed aligned map, called BAM descriptor based on depth information collected from a Microsoft Kinect to monitor the patient's sleeping position (not the full pose) and body movements while in bed [31]. Their follow-up work further included recognition of high-level activities such as removing bed covers as well [30]. Yu et al. also successfully employed the depth data to localize the head and body parts while lying in bed, however their model was limited to the detection of only torso and head [45]. In [9], Chen et al. proposed a subject-specific convolutional neural network trained on a patient's RGB video to maximize feature variance of each body joint to achieve a robust posture estimation model, but the challenges of lighting or being covered in bed were not addressed in this work. Liu et al. proposed an infrared (IR) selective imaging method to effectively capture human pose in full darkness and presented a high performance pose estimator via fine-tuning a CPM model and a realignment method [27]. However, their approach is still limited to the in-bed poses that are not covered. Authors in [2] proposed a deep learning based model to infer 3D patient pose from depth images with an average joint error of 7.56 cm under a simulated occluding blanket. However, their model performance has not been verified in a real setting. Although depth sensors, mainly based on IR are extensively employed for in-bed patient monitoring, depth clues are limited when used for detailed pose inference [31, 45] and have not been verified in real settings [2]. IR sensors (e.g., Microsoft Kinect) are bulky and belong to active sensing category [15], which implies continuous radiation throughout the monitoring process.

In this application, in contrast to the common RGB- or depth-based pose estimation models, we propose a novel in-bed pose estimation technique based on a physics inspired imaging approach, which can effectively preserve human pose information in the imaging process, in complete darkness and even when the person is fully covered under a blanket. Our contributions in accordance with one or more embodiments include: (1) reformulating the imaging process and propose a passive thermal imaging method called Under the Cover Imaging via Thermal Diffusion (UCITD), which is based on long wavelength IR (LWIR) technology; (2) providing efficient ground truth label generation guidelines for LWIR pose images; (3) applying transfer learning on one of the state-of-the-art pose estimation models to effectively make it adapted to human pose estimation under in-bed application requirements and evaluate the proposed pose estimation technique in different real life settings such as hospital or home environments (see FIGS. 2A and 2B); and (4) publicly releasing the first ever labeled in-bed human pose dataset in several modalities including RGB and LWIR images to accelerate the research in in-bed behavior monitoring field. The cost of our UCITD method is lower than pressure mapping solutions, while the pose estimation performance of our solution is higher in both accuracy and granularity of pose estimation.

BRIEF SUMMARY OF THE DISCLOSURE

In accordance with one or more embodiments, a non-contact method is disclosed for estimating an in-bed human pose. The method includes the steps of: (a) capturing thermal imaging data of a human subject lying on a bed using a long wavelength infrared camera positioned above the human subject; (b) transmitting the thermal imaging data to a computer system; and (c) processing the thermal imaging data by the computer system using a model to estimate the pose of the human subject, the model comprising a machine learning inference model trained on a training dataset of a plurality of in-bed human poses.

In accordance with one or more further embodiments, a system is disclosed for estimating a pose of a human subject lying on a bed. The system includes a long wavelength infrared camera positioned above the human subject for capturing thermal imaging data of the human subject lying on the bed. It also includes a computer system coupled to the long wavelength infrared camera. The computer system comprises at least one processor, memory associated with the at least one processor, and a program supported in the memory containing a plurality of instructions, which when executed by the at least one processor, cause the at least one processor to receive the thermal imaging data and process the thermal imaging data using a model to estimate the pose of the human subject, the model comprising a machine learning inference model trained on a training dataset of a plurality of in-bed human poses.

In one or more embodiments, the human subject lying on the bed is at least partially under a cover when the thermal imaging data is captured using the long wavelength infrared camera.

In one or more embodiments, the human subject lying on the bed is uncovered when the thermal imaging data is captured using the long wavelength infrared camera.

In one or more embodiments, the human subject lying on the bed is in a dark space when the thermal imaging data is captured using the long wavelength infrared camera.

In one or more embodiments, the human subject lying on the bed is in a lighted space when the thermal imaging data is captured using the long wavelength infrared camera.

In one or more embodiments, the machine learning inference model is an unsupervised model.

In one or more embodiments, the machine learning inference model is a supervised model, and the training dataset of a plurality of in-bed human poses comprises labeled poses.

In one or more embodiments, the labeled poses are annotated based on images from a visible light camera positioned adjacent to the long wavelength infrared camera, wherein the images from the visible light camera are captured simultaneously with the thermal imaging data.

In one or more embodiments, the machine learning inference model comprises a stacked hourglass network.

In one or more embodiments, the steps of the method are repeated a plurality of times to estimate a series of poses and determine movement of the human subject over a period of time.

BRIEF DESCRIPTION OF THE DRAWINGS

FIG. 2A shows the setup in a simulated hospital room, and FIG. 2B shows the setup in a regular living room.

FIGS. 3A-3F show images captured using an RGB webcam, and FIGS. 3G-3L show images captured using a LWIR camera. The images are taken of the subject without a cover and with two different types (one thin and one thick) of covers.

FIG. 5A shows temperature distribution over a simulated physical object, and FIG. 5B shows a temperature profile over an edge connected to the constant temperature surface.

FIG. 6A shows a false leg pose (in red) caused by the heat residue in the LWIR image, and FIG. 6B shows a false arm pose (in red) due to the cuddled limbs. The correct limb poses are shown in green.

FIG. 11A shows pose estimation performance in terms of pose detection accuracy and granularity, and FIG. 11B shows economic/deployment costs based on the monetary expense and the volume of each system.

DETAILED DESCRIPTION

Figure 1:
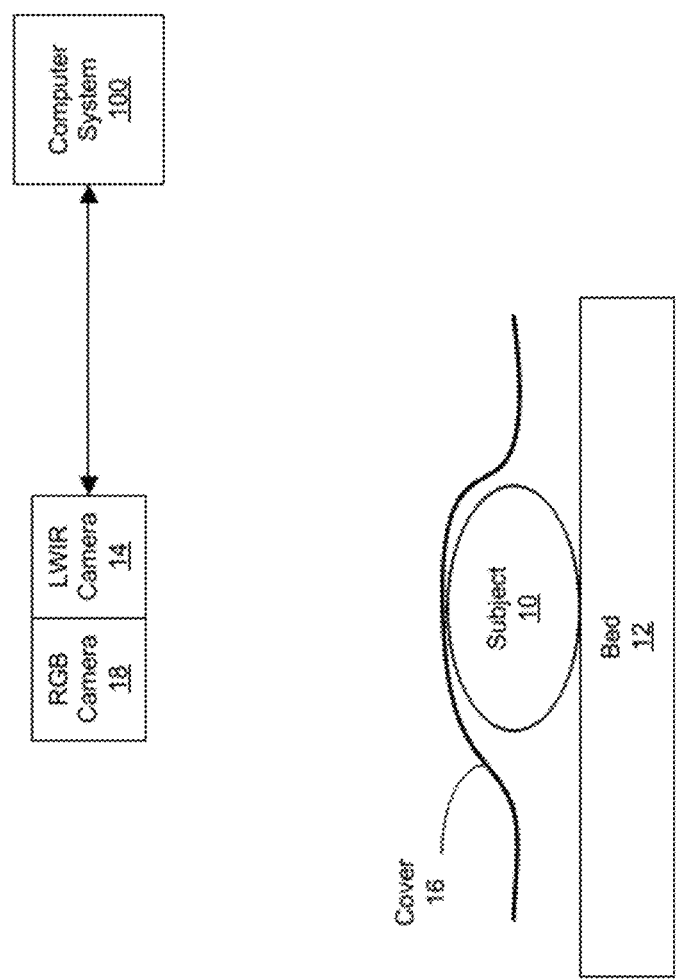
FIG. 1 is a simplified diagram illustrating an exemplary system for estimating a pose of a human subject lying on a bed in accordance with one or more embodiments.

FIG. 1 is a simplified diagram illustrating an exemplary system for estimating a pose of a human subject 10 lying on a bed 12 in accordance with one or more embodiments. The system includes a long wavelength infrared camera 14 positioned above the human subject 10 for capturing thermal imaging data of the human subject 10. Long wavelength infrared cameras can be used for thermal imaging of objects higher in temperature than room temperature based on thermal emissions only, requiring no illumination. Long wavelength infrared cameras typically detect infrared wavelengths in the range of 7-12 microns.

The human subject 10 may or may not be covered by a sheet, blanket, or other cover 16.

A computer system 100 is coupled to the long wavelength infrared camera 14. The computer system 100 receives the thermal imaging data from the camera 14 and processes the thermal imaging data using a model to estimate the pose of the human subject. The model comprises a machine learning inference model trained on a training dataset of a plurality of in-bed human poses.

A visible light camera (e.g., an RGB camera) can optionally be positioned next to the long wavelength infrared camera 14 for capturing visible light images simultaneously with the thermal imaging data. As discussed below, the RGB camera is only used for assistance in generating a training dataset. The RGB camera is not used in the process for estimating poses.

In-Bed Pose Estimation: Problem Formulation

Deep learning regularly obliterate records for regression and classification tasks that have previously seen only incremental accuracy improvements [21]. However, this performance comes at a large data cost, frequently requiring upwards of 106 data/label pairs. Our digital economy has provided many problems for which such data exists or can be obtained cheaply relative to the benefits. In computer vision field, thanks to the continued effort in publishing open source datasets such as COCO [8], MPII [3], and LSP [19] datasets, huge accuracy improvements in deep learning models for human pose estimation and tracking [10, 34, 41] have been achieved. However, the recent success of the deep learning-based human pose estimation models has not been passed on into the in-bed pose estimation problem due to lack of labeled and publicly available datasets that imitate the extreme conditions in in-bed scenarios. In the following, we will review these challenges and present our physics guided UCITD approach that allowed us to form an accurately labelled in-bed pose dataset, which led to an accurate in-bed pose estimation model.

Challenges to be Addressed

The most common imaging process used to capture daily human activities are RGB cameras based on visible light. In this process, images are achieved by the light coming from the light source S as it is reflected from the surface of the physical entity that is imaged. In a simplified image formation model presented in [16], an image I is assumed to be a 2-dimensional function I(x, y)=R(x, y)L(x, y), where R(x, y) and L(x, y) are the reflectance and illumination functions, respectively. In this model, a complete image can only be achieved under well-illumination when the target entity is not occluded. However, in the case of in-bed pose monitoring, for a covered individual in full darkness (overnight monitoring), both R and L functions are heavily distorted, which introduce difficult imaging challenges in this application, including: (1) the illumination term L is reduced nearly to zero, and (2) the reflectance term R from the human is mainly replaced by the cover reflectance Rc, which is a different physical entity. FIGS. 3A-3F show the RGB images taken without and with covers from a person lying in the bed.

Reformulating the Imaging Process

To discover a proper imaging process capable of addressing the aforementioned challenges, we reformulate the imaging process as follows. Let's assume the majority of the physical entities in the world (e.g., human bodies) can be modeled as articulated rigid bodies by ignoring their non-rigid deformation. The physical world composed by N rigid bodies then can be described by a world state model [26], such that:

$$W_s = \{\alpha_i, \beta_i, \phi(i,j) | i,j \in N\}. \quad (1)$$

where $\alpha_i$ stands for the appearance and $\beta$ stands for the pose of rigid body i, and $\phi(i, j)$ stands for the relationship between rigid bodies i and j. For example, a human has N (depending on the granularity of the template that we choose) articulated limbs in which each limb can be considered a rigid body and the joints between the limbs follow the biomechanical constraints of the body. Expanding beyond the simplified model [16], the reflectance distribution in the scene are considered to be determined by each physical entity's characteristics, $\alpha$ and $\beta$. Assuming light source S as the source of illumination, image I can be modeled as a function $I = I(W_s, S)$.

Different physical entities usually hold different reflectance characteristics due to differences in their color, shape, and surface roughness which provides major discriminative clues for computer vision (CV) tasks. Many CV methods originate from such differences, such as color, edge, and texture features used in histogram of oriented gradients (HOG) [11, 29] and scale-invariant feature transform (SIFT) [28] algorithms. Although, lighting challenges are being addressed by casting invisible illumination such as infrared (IR) via depth sensing [2, 27, 30, 31], the issue of fully covered objects still is unsolved, especially in the area of human behavior monitoring. We argue a necessary condition to recognize covered object using the following lemma.

Lemma 1. A physical object is recognizable after being covered by another physical entity, only if image of the world state after the cover being applied $W_s \rightarrow c$ is conditioned on the characteristics of the target object, or equivalently, $I = I(W_{a \rightarrow c}, S | \alpha_t, \beta_t) \neq I(W_{s \rightarrow c}, S)$ where, $\alpha t, \beta_t$ stand for the target object's appearance and pose term.

In the case of a classical RGB-based imaging process, when the target object is totally blocked by another physical entity, we will have $I(W_{s \rightarrow c}, S_{RGB}) = I(W_{s \rightarrow c}, S_{RGB} | \alpha_t, \beta_t)$. This means that the resultant RGB image will be independent of the target object's characteristics when it is fully covered. Note that such dependence is not always intractable under the cover. For example, high penetration radiation imaging such as X-Ray or ultrasound can capture the image of a physical object even if it is blocked by another physical entity. However, such radiation is often harmful to human if use for long period of time [13, 14, 38]. In contrast, commercially available depth sensors are safe for humans, but they have no penetration capability. Nonetheless, the depth image of a covered object is actually partially conditioned on the target object's pose and satisfies Lemma 1, hence it shows promising results for the under cover condition [2]. However, we argue its limitation due to the randomness of the cover deformation and its partial dependence to the occluded entities.

Figure 4A:
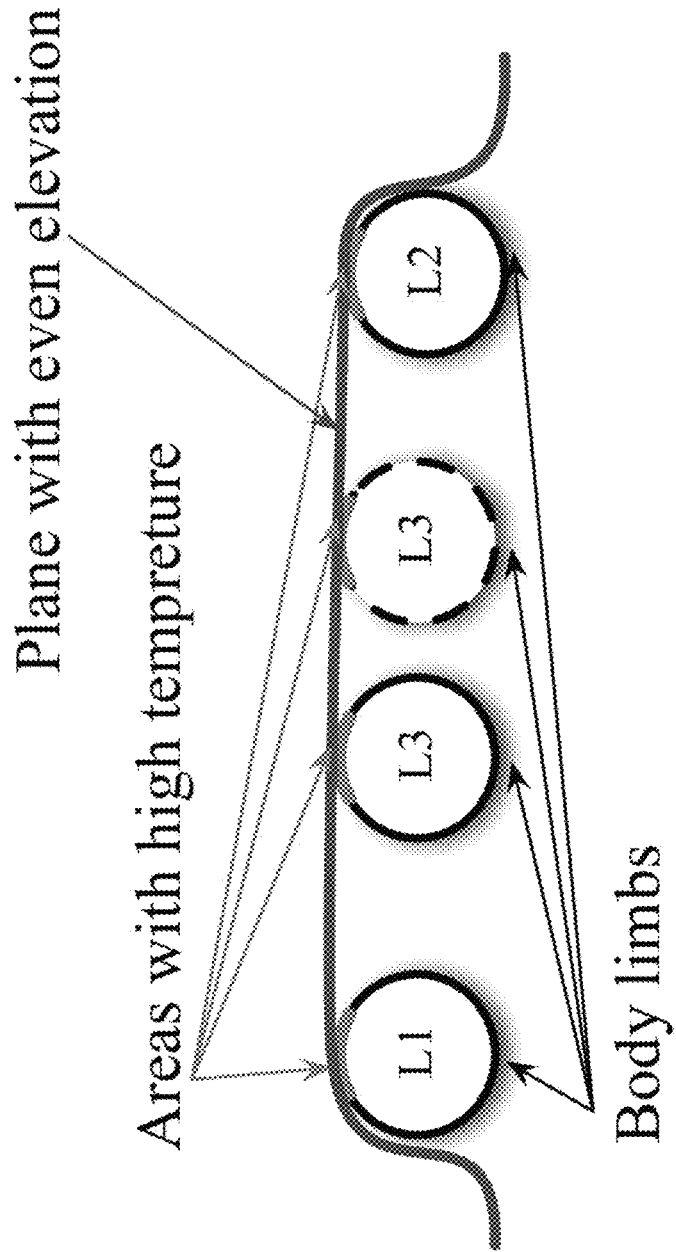
FIG. 4A is a simplified diagram illustrating multiple limbs under a cover.

The following example demonstrates the ambiguity of depth sensing for covered objects, in particular human body under a blanket. Let's simplify human limbs with geometric primitive as cylinders. Suppose three limbs $L_1$, $L_2$ and $L_3$ with the same diameter are covered by a blanket, which is mainly supported by $L_1$ and $L_2$ with $L_3$ in between. If the cover is tightly bent by $L_1$ and L, then the elevation (depth) of the plane is independent of the pose of $L_3$. In FIG. 4A, the positions of solid and dashed $L_3$ are both valid solution to the depth image formed based on the cover plane. Even when the cover is slightly loose, the small elevation differences caused by $L_3$ can be easily overwhelmed by the sensor noise, which would not form a strong evidence for limb localization. This could be the reason why many existing work based on depth sensing can only estimate a rough pose configuration (e.g., lying direction, or head and torso position) rather than limb localization [30, 31, 45].

Under the Cover Imaging Via Thermal Diffusion (UCITD)

Figure 4B:
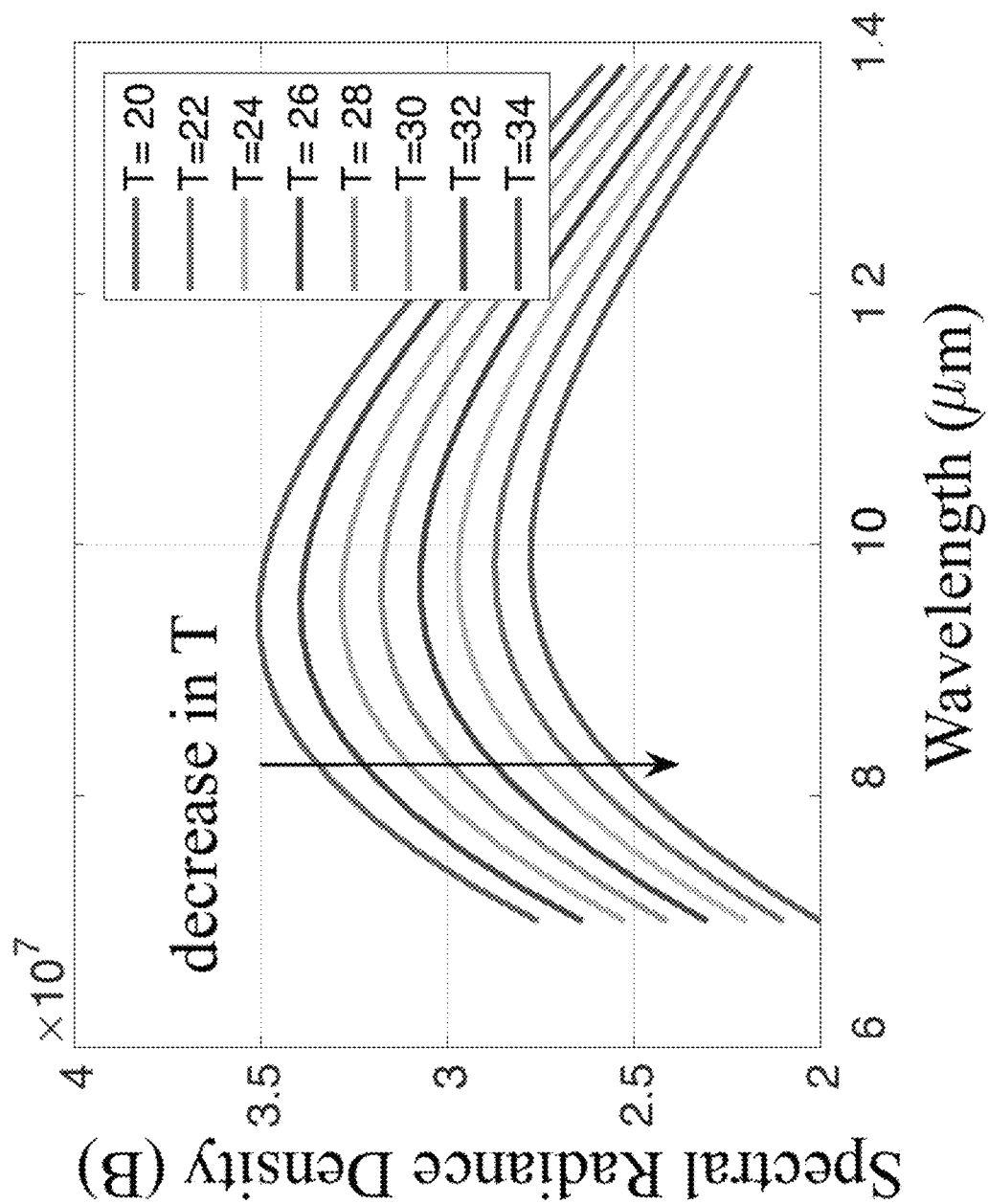
FIG. 4B is a graph illustrating spectral-energy distribution of radiation emitted by a blackbody at different temperature T (in Celsius).

Although most imaging processes are based on reflected light radiation, classical physics proves that all physical objects have their own radiation, which can be approximated by their blackbody characteristics [20]. The Planck's radiation law, a mathematical relationship formulated in 1900 by German physicist Max Planck describes the spectral-energy distribution of radiation emitted by a blackbody as:

$$B_v(T) = \frac{2hv^3}{c^2} \frac{1}{e^{\frac{hv}{KT}} - 1} \qquad (2)$$

where $B_v$ is the spectral radiance density of frequency v per unit frequency at thermal equilibrium at absolute temperature T, h is plank constant, c is the speed of light, and k is the Bolzmann constant. Eq. (2) shows that the blackbody has a specific spectrum and intensity that depends only on the body's temperature. As the temperature decreases, the peak of the blackbody radiation curve moves to lower intensities and longer wavelengths as shown in FIG. 4B.

Planck's radiation law provides insights to solve our specific in-bed pose estimation problem, in which even though there is lack of illumination from limbs under the cover, there will always be temperature differences between human body and the surrounding environment. The temperature of the skin of a healthy human is around 33° C., while clothing reduces the surface temperature to about 28° C. when the ambient temperature is 20° C. [22]. FIG. 4B shows that for objects in ambient temperature, the corresponding radiation energy concentrates in long wavelength infrared (LWIR) spectrum which is around 8-15 µm. Furthermore, human surface shows notable higher radiation than surroundings according to the Eq. (2). In the context of thermal imaging, instead of specific color and texture pattern, temperature patterns generates the image I. This process is known as radiation thermometry [15].

Although blankets are not transparent to the LWIR radiation, the contact between cover and body parts while lying in bed introduces another physical phenomenon called heat transfer, which dramatically alters the temperature distribution around the contacted areas. This phenomenon can be described by the diffusion equation $$\nabla^2 T = \frac{1}{a} \frac{\partial T}{\partial t}, \qquad [24]$$

where T=T(x, y, z, t) is the temperature as a function of coordinates (x, y, z) and time t, a is the thermal diffusivity, and $\nabla^2$ is a Laplacian operator.

Figure 5A:
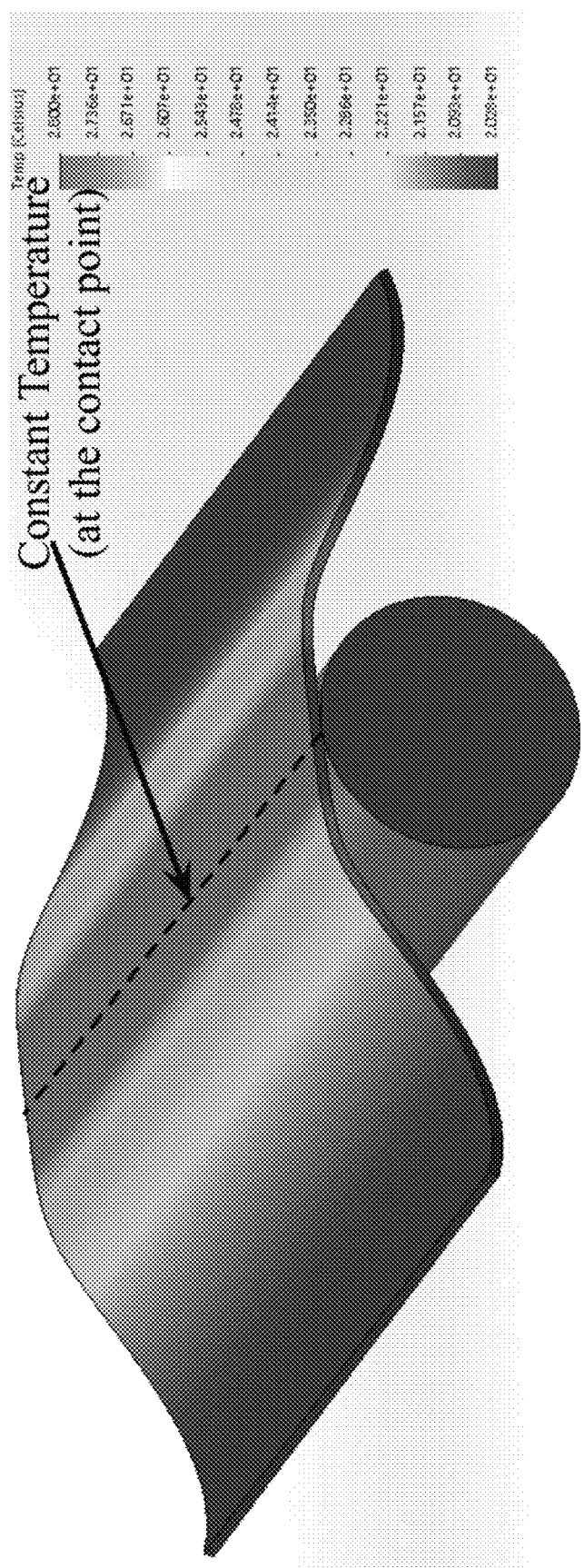
FIGS. 5A and 5B illustrate temperature simulation of a covered cylinder with constant temperature.
Figure 5B:
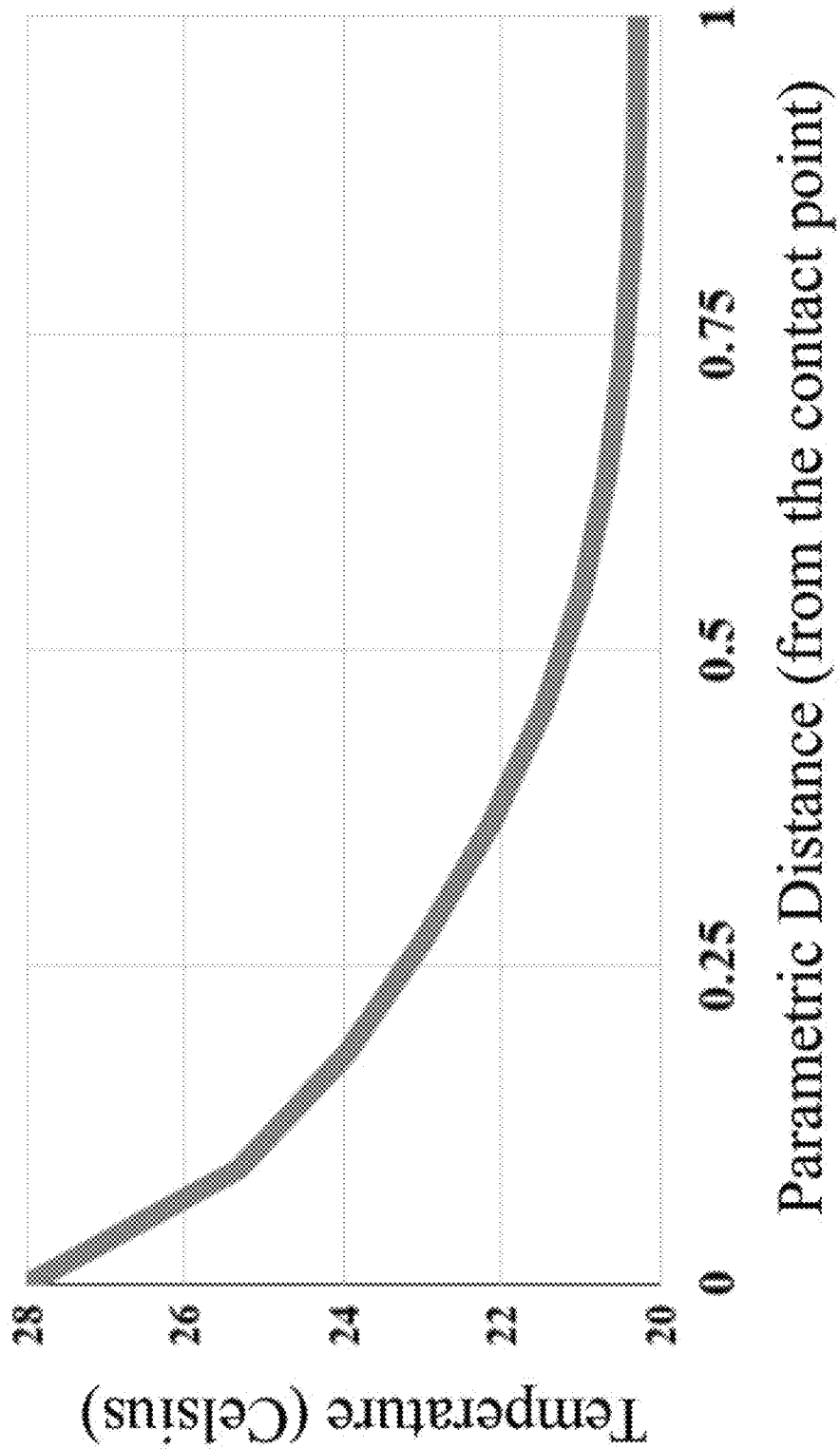

Instead of exact modeling of a covered human body, we simplified each human limb as a cylinder that is covered by a thin physical layer. A Solidworks model is build up with a cylinder of diameter 50 mm and a cover with thickness 2 mm as shown in FIG. 5A. We assume the contact point of the cover will turn into a constant temperature similar to the human the human clothes temperature ($\approx$28° C.) after sufficient time. Heat will diffuse into environment, which has constant temperature of 20° C. To simplify the simulation, we assumed one area is in contact with the limb and it would hold a constant temperature of 28° C. as a boundary condition. The temperature profile along the edge next to the contacting area is plotted in FIG. 5B.

Such simplified model reveals that the contact point of a cover has the peak temperature. Furthermore, when a limb is covered with a sheet or a blanket, the location of the contact point directly depends on the shape and the location of the limb. In other words, the heat map will highly depend on the $\alpha$ and $\beta$ of the covered limbs which satisfy the condition proposed in Lemma 1 and endorses the feasibility of LWIR for under the cover human pose estimation: I=I $(W_{s \to c}, S_{LWIR} | \alpha_t, \beta_t) \neq I(W_{s \to c}, S_{LWIR})$. Admittedly, the real setting is more complicated than our simplified model. There could be multiple peaks in contacting area due to the wrinkles in the cover. Nearby limbs will also result in more complex temperature profile due to the overlapping effect. But the dependency of the heat map over the limb's $\alpha$ and $\beta$ will still hold. As we can see, human profiles in FIGS. 3G-3L via thermal imaging is well recognizable even when it is fully covered with a thick blanket. FIG. 4B also shows the advantage of LWIR as the heated area of $L_3$ will depend on its location as long as it is contacted by the cover, which would resolve the ambiguity issue raised in depth imaging. We call this approach under the cover imaging via thermal diffusion (UCITD).

UCITD Ground Truth Labeling

Although a human profile under the cover is visible via UCITD, the pose details are not always clearly recognizable by only looking at the LWIR images. Human annotators are likely to assign wrong pose labels when labelling LWIR images, which introduces noisy labeling challenge to this problem. To address this issue, using the world state model as described in Eq. (1), we cast the imaging process as a function that maps the physical entity and its cover into the image plane as I=I($\alpha_t, \beta_t, \alpha_c, \beta_c$), where $\alpha_t, \beta_t, \alpha_c$ and $\beta_c$ stand for the target's and cover's appearance and pose, respectively. In this formulation, I could be the result of any of the feasible imaging modalities such as I$\in\{I_{RGB}, I_{Depth}, I_{LWIR}, \ldots\}$.

A labeling process then can be defined as a function L that maps the I to the target pose state $\beta_t$ such that $\beta t=L(I(\alpha_t, \beta_t, \alpha_c, \beta_c))$. Errors in labeling for under the cover cases can be explained as the high dependency of function L to parameters independent from the target's pose. As all these parameters (i.e., $\{\beta_t, \alpha_c, \beta_c\}$) can be decoupled from $\beta_t$ [26], they can be deemed as the hyperparameters of function L, in which L performance can be improved by careful selection of them. Unlike most hyperparameters during a mathematical modeling process [5], these variables are directly related to the physical properties of the object, so we refer to them as the physical hyperparameters. Though not as flexible as implicit hyperparameters in mathematical models that can be freely adjusted, we show that in our application, physical hyperparameters can also be altered effectively to optimize target L performance. Based on this formulation, we propose the following three guidelines to achieve a robust LWIR image labeling.

Guideline I: Labeling with Variable Cover States

Physical hyperparameters $\{\beta_t, \alpha_c, \beta_c\}$ cannot be altered mathematically to their optimal values due to their physical constraints. For example, the subject's appearance cannot be changed without affecting $\beta_t$. However, altering $\alpha c$ and $\beta_c$ can be easily achieved without affecting $\beta_t$. So we introduce our first guideline for LWIR image labeling:

Guideline I: Perform labeling under settings with same $\beta_t$ but no cover to yield best pose labeling performance.

In practice, we employed Guideline I by collecting data not only from covered individuals in bed but also from the same persons without cover for exact the same pose $\beta_t$. In this way, we actually altered $\alpha_c$ and $\beta_c$. Some examples from such data collection process are shown in FIGS. 3A-3L. To get pose $\beta_t$ in FIG. 3I, we labeled FIG. 3G, which is supposed to have identical pose $\beta_t$ as FIG. 3I.

Guideline II: Cross Domain Referencing

Figure 6B:
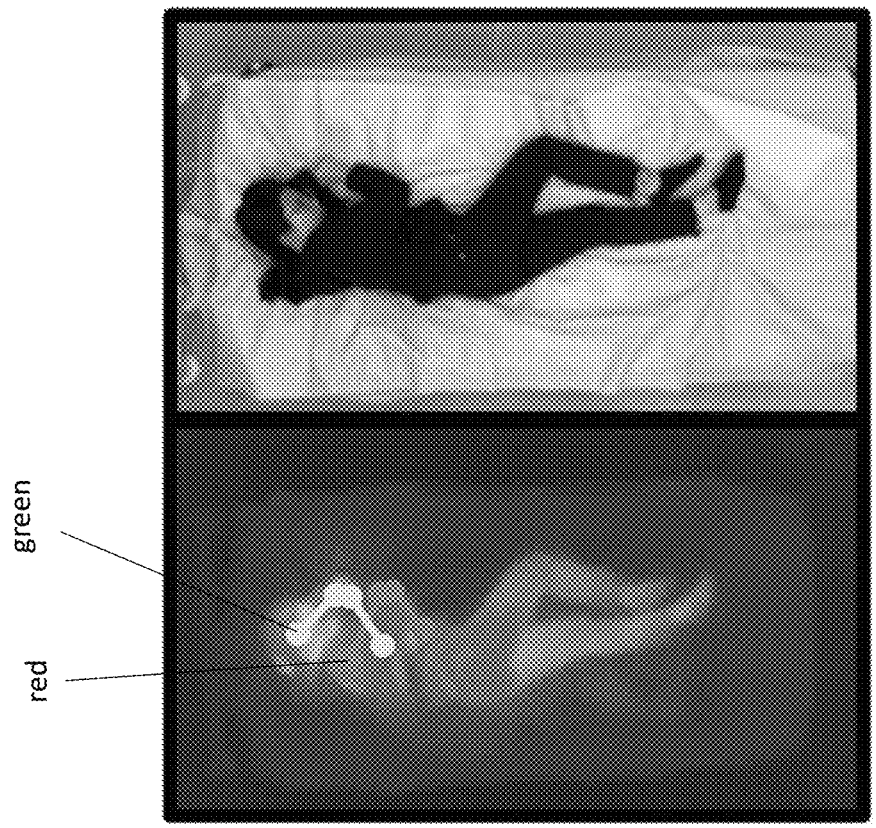
FIGS. 6A and 6B illustrate pose ambiguities in LWIR images with their corresponding RGB images.
Figure 6A:
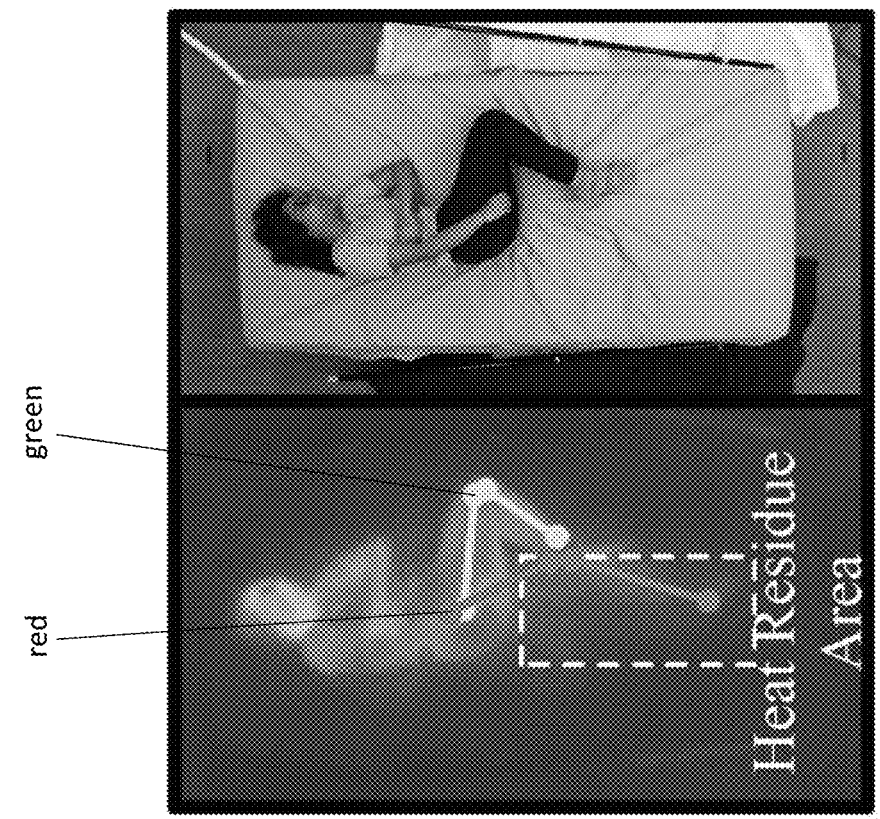

Imaging via thermal diffusion is promising for under the cover human detection and distinguishing the human from the background. However, since body limbs share very similar temperature (thus similar radiation based on Eq. (2)), they may not be highly distinguishable from each other. Moreover, as a human moves in a bed, the "heat residue" of the previous pose will result in ghost temperature patterns as the heated area needs to diffuse heat over time according to the diffusion equation (see FIG. 6A). Although, the heat residue concern for real life in-bed pose monitoring will not be an issue, for our in-bed pose dataset forming was an excruciating difficulty that needed to be addressed due to its misleading effect for annotation. Unlike real life sleeping scenarios, we could not expect the participants to stay in a given pose for more than a few minutes, otherwise the data collection duration would have been excessively long. We addressed this problem by accelerating the heat diffusion progress via a cooling process, which is further discussed below. Even using the cooling process, complete elimination of the heat residue in a short time period is not achievable in practice. Another ambiguity in limb localization is when limbs are cuddled together with no clear boundaries as shown in FIG. 6B. In this example, when one arm is on top of the torso, it is hard to tell the exact location of each as they share a very similar temperature.

These conditions do not necessarily lead to a fully intractable pose localization problem since there still exist cues in the temperature image for limb localization such as the residue will have slightly less temperature value compared to true body location (see FIG. 6A), or the arm will still show a (weak) profile on the torso (see FIG. 6B). Nevertheless, these subtle cues in an LWIR image may be missed by the human annotators, which will not happen if they are given the RGB image counterpart (see RGB images in FIGS. 6A and 6B). This motivated us to alter functional I to improve labeling by introducing second guideline:

Guideline II: Employ the IRGB counterpart as a heuristic guide to prune out false poses in ILWIR.

Guideline III: Cross Domain Labeling with Bounded Error

Although Guidelines I and II can be employed for most cases to achieve highly accurate ground truth labels, cases exist that a limb is nearly intractable when it is fully overlapped with another body part (e.g., a crossed arm over torso). While in RGB images, the difference between the color/texture of different body parts can be used as differentiating cues, in LWIR images uneven temperature distribution when two limbs cross each other makes the detection of the limbs' boundaries difficult. Here, using the RGB image counterpart, we expand the Guideline II to include the projection of the $I_{RGB}$'s labels into the $I_{LWIR}$'s labels.

When two images share the same planar surface, plane to plane mapping between them is feasible through homography [17]. However, mapping between two $I_{RGB}$ and $I_{LWIR}$ images taken from a human subject in a given pose will result in a ghosting effect in homography mapping [43], which is also well known in panoramic image creation [40]. Since human's top surface while lying in a bed is not a flat plane, when approximated by a plane parallel to the bed, coordinate bias persists throughout the imaging area. Ghosting problems will inevitably result in the coordinate bias for domain to domain labeling, however, we believe such error is bounded in specific settings.

Figure 7:
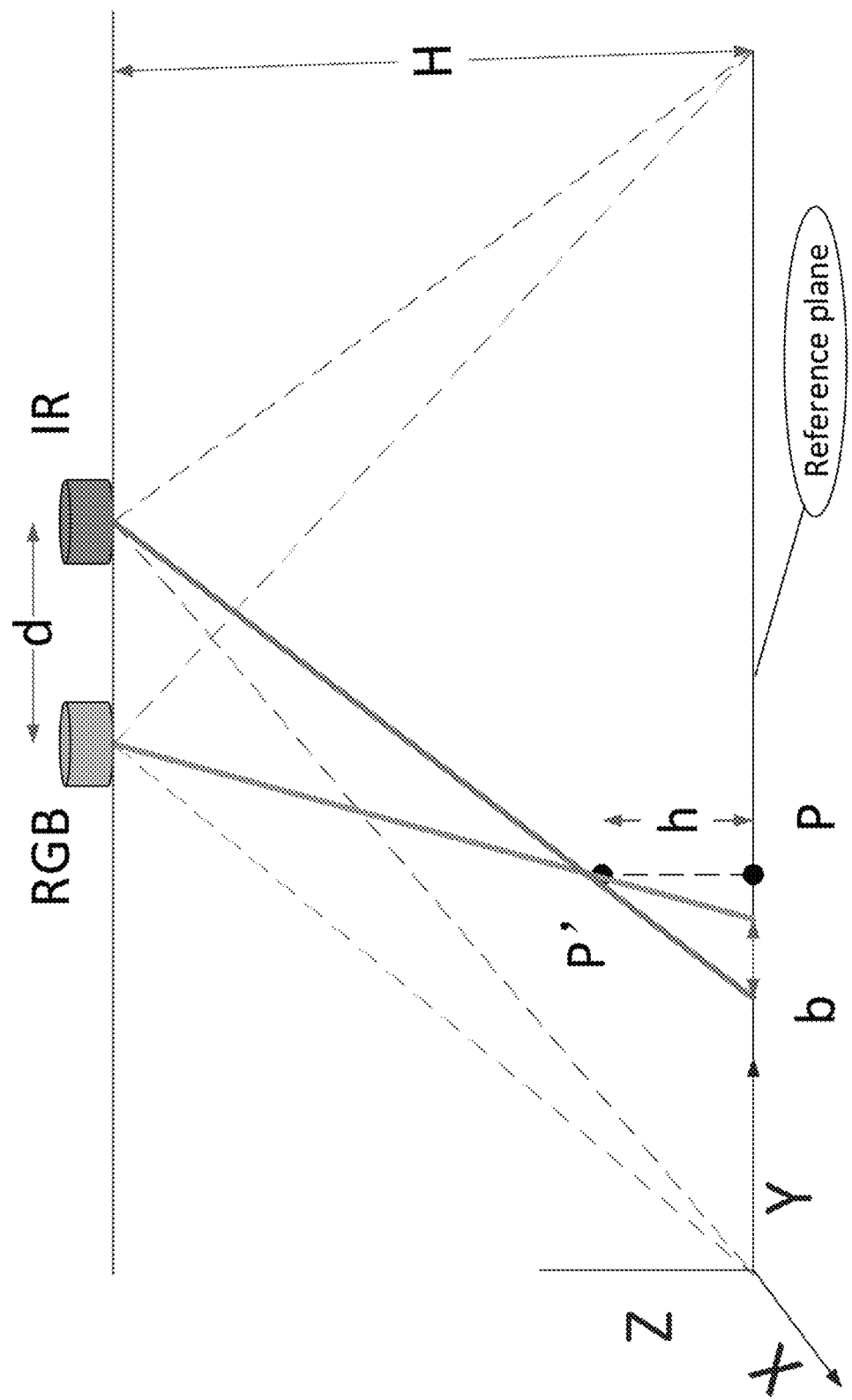
FIG. 7 illustrates the presence of ghosting error and between-camera mapping bias caused by elevation from a reference plane.

Suppose multiple domain cameras are mounted on the same plane. After homography calibration, one point's coordinates on a reference plane can exactly be mapped from one domain to another. Let p be a point on the reference plane, which has exact mapping from RGB to LWIR domain. If we elevate p by h to a higher position p', the ghosting bias will occur, in which a mapped point will not coincide with the corresponding point in another camera, as illustrated in FIG. 7. If we look at p' from RGB camera, its image point in $I_{RGB}$ image is equivalent to its projection pRGB (the green solid line) on the reference plan. Homography mapping in this case is actually mapping p' projection pRGB to another domain (LWIR). However, the true projection of p' in another domain pLWIR is actually biased from the mapped projection by homography. Suppose the distance from camera mounting plane to the reference plane is H; p' is biased from reference plane with z=h; distance between two cameras is d; and bias between two projection points in different domain is b. From the geometry shown in FIG. 7, we have $$b = d \times \frac{h}{H-h};$$

where d is a preset value for a specific mounting configuration, however H and h are both variables in real applications. H will be determined by the bed height and also the ceiling height. h depends on the limb length and how much it sticks out of the bed plane. So the bias b can hardly be determined in application, however H and h should be bounded due to the practical and physical constraints, such that $h \in [h_{low}, h_{high}]$, $H \in [H_{low}, H_{high}]$. Namely, a hospital or residence room does not have higher than 10 meters ceiling and a human cannot stick out his limb away from the bed plane more than 1.5 meters when lying. When h=0, then b=0 which reduces to the case of exact homography mapping when point is located on the reference plane. When d=0, it reduces to the case of pure rotation in which the bias will also be eliminated [39]. In worst case, a point is biased far away from the reference plane with $h=h_{high}$ and a short ceiling height $H=H_{low}$. So, the bias between mapping of a point from $I_{RGB}$ to $I_{LWIR}$ images is bounded as $$b \in \left[0, \frac{d \cdot h_{high}}{H_{low} - h_{high}}\right].$$

Using this bounded mapping error, we propose third guideline for labeling:

Guideline III: When finding exact joint locations are intractable in one domain, employ labels from other domain with bounded bias via homography mapping.

We have developed a semi-automated labeling software based on these guidelines to generate reliable ground truth labels for the RGB+LWIR UCITD pose dataset.

Undercover Pose Estimation Evaluation

To achieve a robust and accurate in-bed pose estimation model using UCITD, we first introduce our data collection system that enabled us to form our UCITD pose dataset with both RGB and LWIR modality, followed by describing the ground truth labeling process using the three aforementioned guidelines. Using the UCITD dataset, we fine-tuned a state-of-the-art pose estimation model (i.e., a stack hourglass network trained on RGB pose datasets) to transfer the learning to estimation of the poses in sleeping postures even when the subject is fully covered with a thick blanket. Finally, we conducted a multifactor evaluation procedure to compare the performance of our in-bed pose estimation technique in terms of accuracy and cost efficiency with the other forefront methods in the in-bed pose monitoring field.

Experiment Setup to Form UCITD Dataset

Figures 2A, 2B:
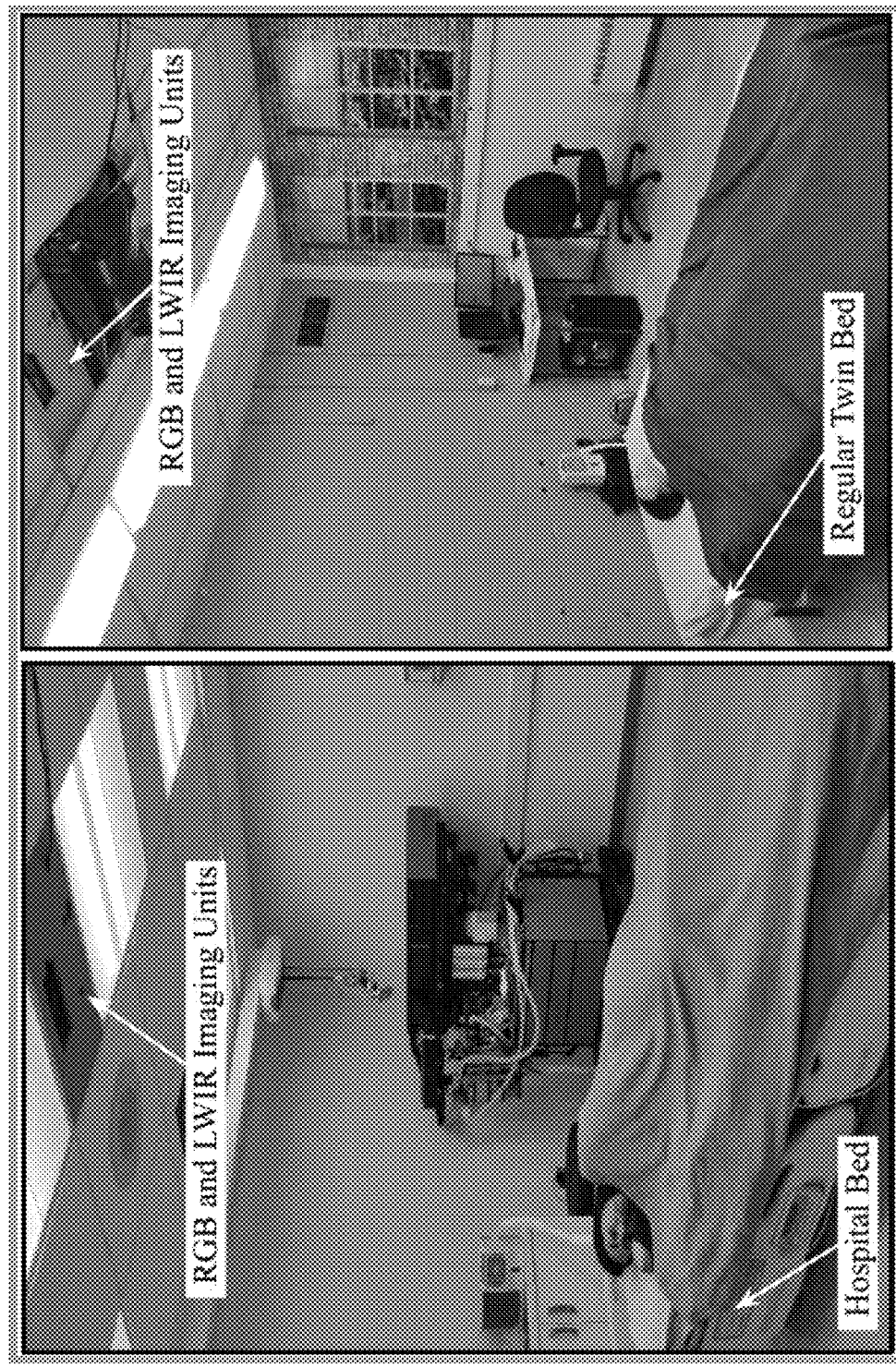
FIGS. 2A and 2B illustrate an exemplary multi-domain in-bed pose data collection setup.
Figures 3D, 3E, 3F:
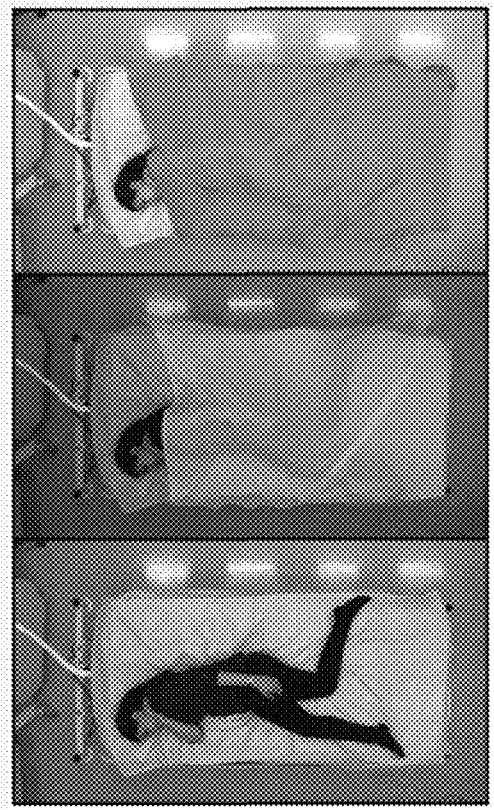
FIGS. 3A-3L show sample images of a subject in-bed supine and side postures.
Figures 3A, 3B, 3C:
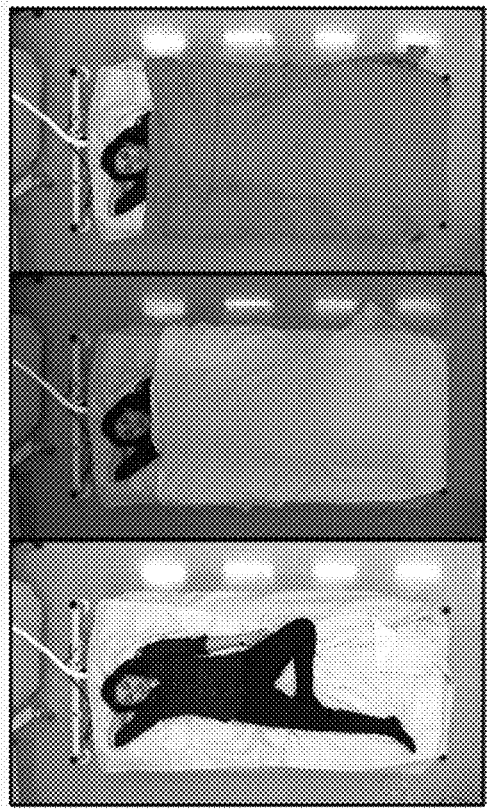
Figures 3J, 3K, 3L:
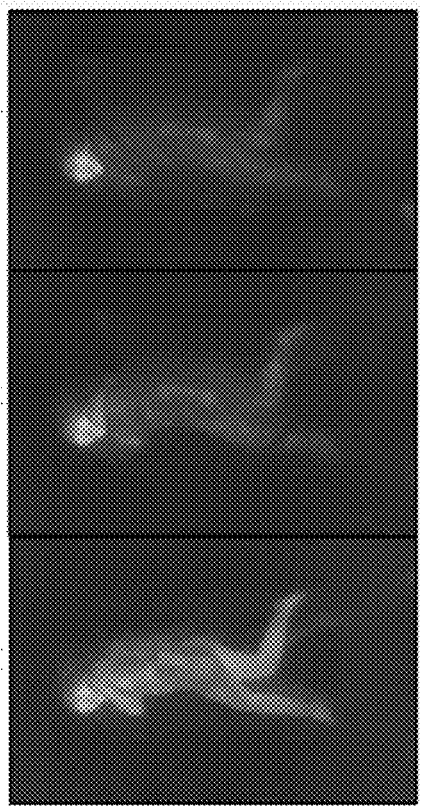
Figures 3G, 3H, 3I:

FIGS. 2A and 2B show our experimental setup in a simulated hospital room and a lab environment turned into a regular living room, respectively. In each room, we mounted one RGB camera (a regular webcam) and one LWIR camera (a FLIR thermal imaging system) in parallel on a wooden board with similar size of ceiling board. They are vertically aligned adjacent to each other to keep small distance. Using an IRB-approved protocol, we collected pose data from 7 volunteers in hospital room and from another volunteer in the living room, while lying in the bed and randomly changing pose under three main categories of supine, left side, and right side. For each pose, we altered the physical hyperparameters of the setting via manual intervention. We collected the images from both RGB and LWIR camera simultaneously to alter the function I. Moreover, we changed the cover condition from uncover, to cover one (a thin sheet with ≈1 mm thickness), and then to cover two (a thick blanket with ≈3 mm thickness) to alter ac and ftc. In each cover condition, we waited about 10-20 seconds to mimic a stabilized pose during a real life monitoring scenario. Data collection in the hospital room and the living room allowed us to form UCITD in-bed pose dataset under two different settings (called "Hosp" and "Room") to evaluate the generalization property of our pose estimation model. Ultimately, the fully annotated UCITD in-bed pose dataset will have pose data from 100 anonymized individuals and will be publicly released in early 2019.

Ground Truth Labeling Evaluation

To evaluate the performance of our ground truth labeling guidelines, we labeled the collected LWIR pose images by finding 14 body joints in each, based on three different strategies: (1) LWIR-G1 which employs only Guideline I, (2) LWIR-G3 which employs only Guideline III, and (3) LWIR-G123 which employs all three guidelines. As this is an evaluation of ground truth generation process, there is no higher level standard to refer to, therefore we used the labeling results of LWIR-G123 as the golden standard and evaluated how much other strategies are biased from this one using a normalized distance metric (based on the probability of correct keypoints (PCK) [3]) to visualize the error distribution when different labelling strategies are used.

Figure 8A:
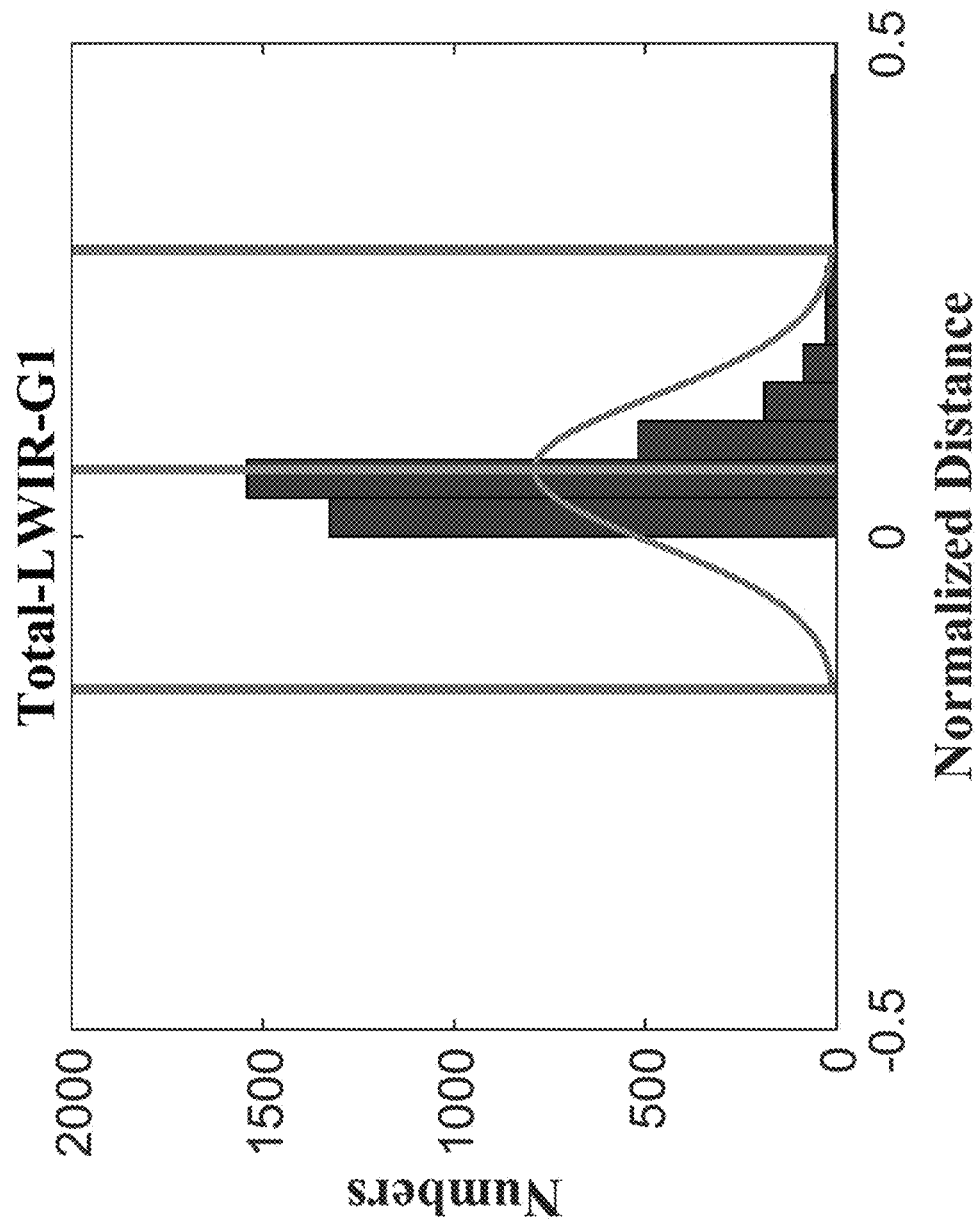
FIGS. 8A and 8B show truncated histograms of normalized distance from the gold standard labels (using LWIR-G123) for labels using LWIR-G1 (FIG. 8A) and LWIR-G3 (FIG. 8B). A Gaussian curve is fitted with green vertical lines as the mean and 3 standard deviation bounds.
Figure 8B:
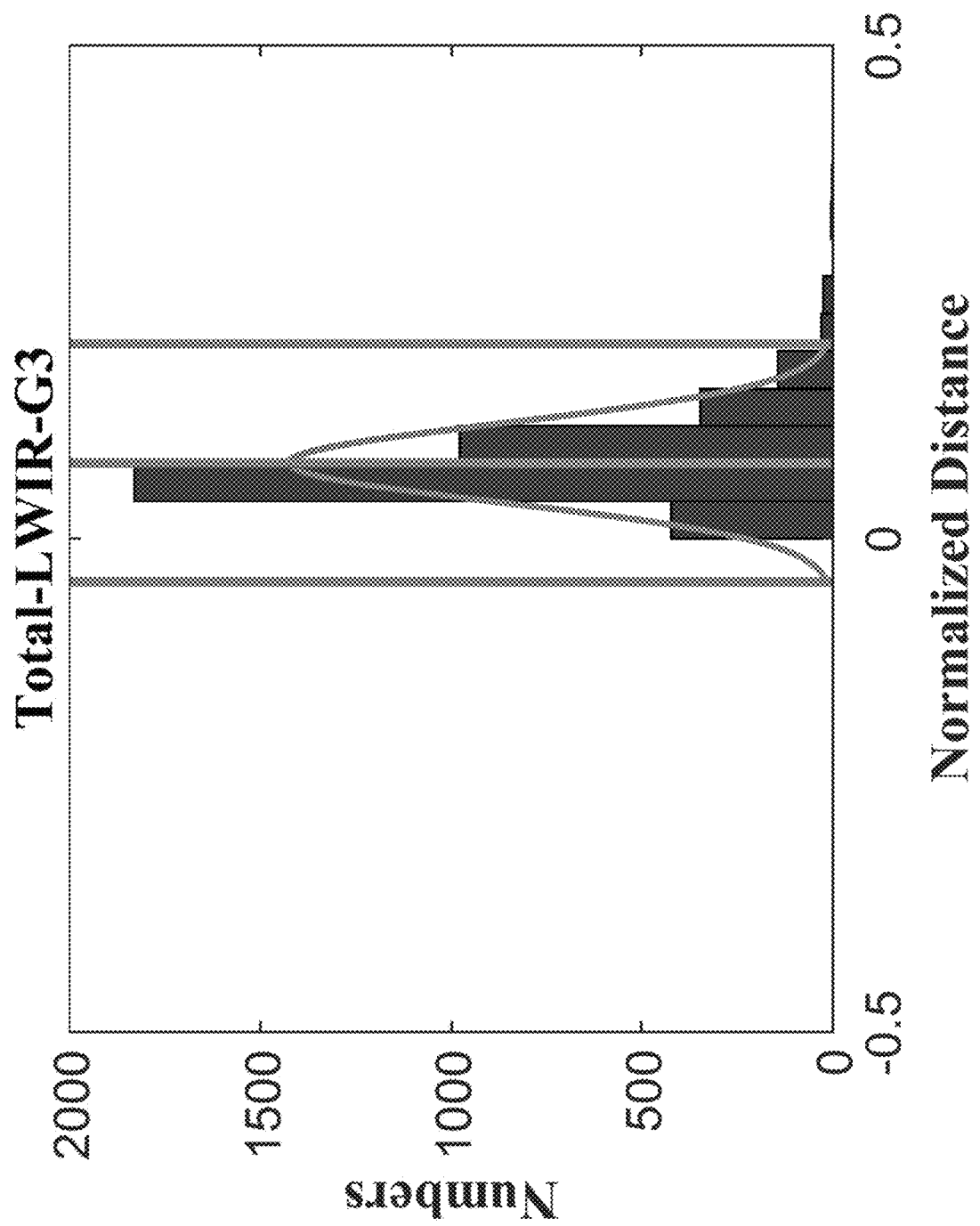

The total differences between the labels from the golden standard (LWIR-G123) and the LWIR-G1 and LWIR-G3 are shown in FIGS. 8A and 8B as the histograms of normalized distance error with fitted Gaussian curve. Compared to the LWIR-G3, LWIR-G1 error shows lower mean value however larger variance, which demonstrates using LWIR-G1 yields high accuracy for recognizable poses yet has higher bias for the ambiguous cases. In contrast, LWIR-G3 causes the ghosting errors that persist throughout the labeling process, but insignificant bias.

RGB to LWIR: Pose Model Transfer Learning

To evaluate the pose estimation performance of the proposed pipeline, we fine-tuned a state-of-the-art 2D human pose estimation model, the stacked hourglass (hg) network [34], using the LWIR images from 6 subjects (out of 7 subjects) in "Hosp" dataset. Each LWIR image is extended to 3 channels to match the RGB input format of the hg model.

Figure 9:
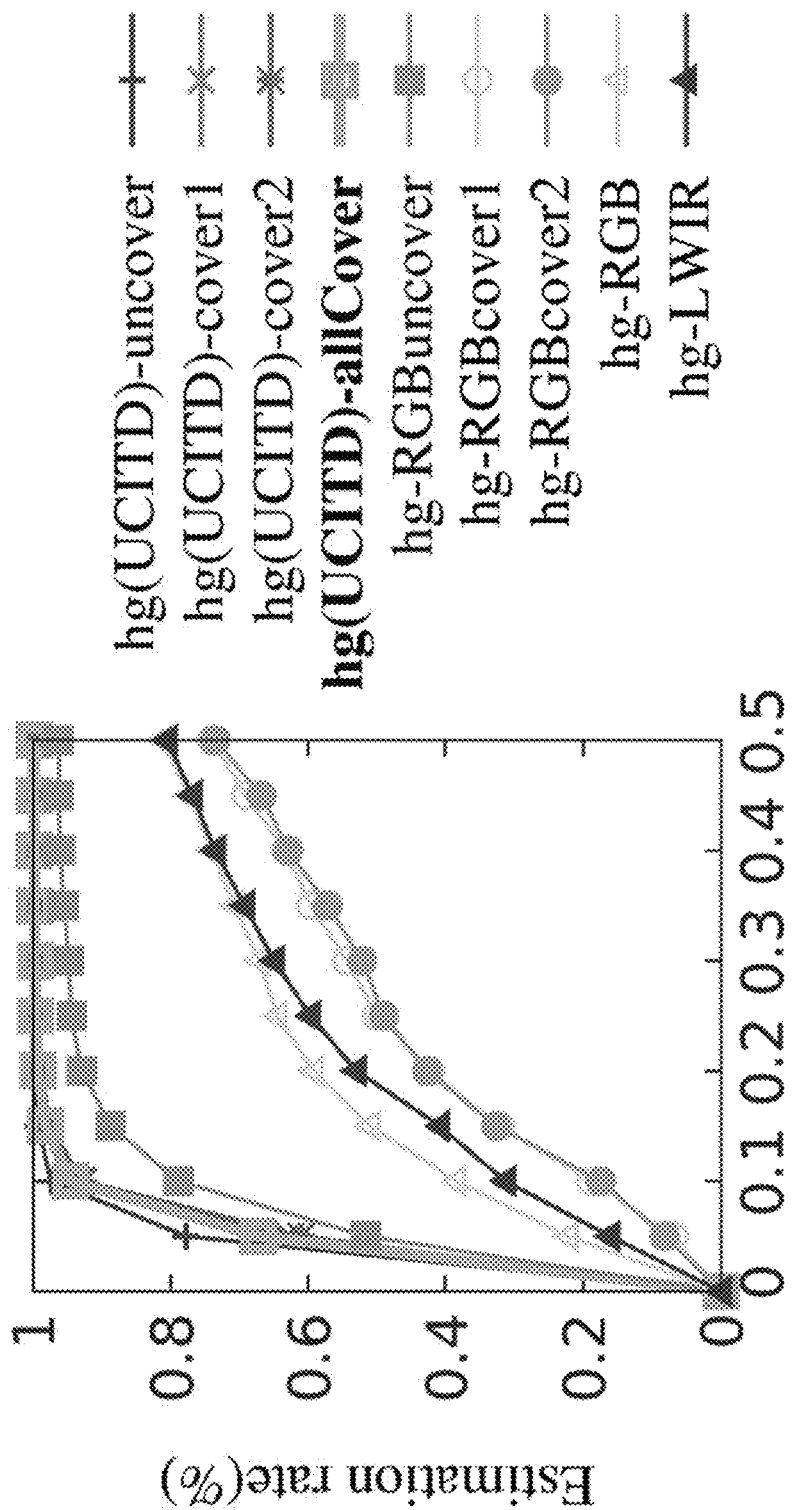
FIG. 9 shows PCK evaluation of in-bed human pose estimation models tested on data from a "Hosp" setting with different cover conditions. hg(UCITD) stands for the fined tuned hourglass model on the UCITD dataset followed by cover conditions. hg-LWIR stands for applying a pre-trained stacked hourglass (hg) model directly on LWIR dataset. hg-RGB stands for applying a pre-trained hg model directly on our in-bed RGB dataset.

We followed the original 8 stacked hourglass structure. For the fine tuning, we combined all cover cases of 810 samples, with batch size of 4,300 iterations, 10 epochs with learning rate of 2.5e-4. In the original hg model, the very last layer is a 1×1 convolutional layer that forms the final joint heat maps. During the training session, we froze all of the layers of the pre-trained hg model except the last one to transfer the learning into the "Hosp" LWIR dataset, and form our hg-trans model. The pose estimation performance of the hg-trans model is evaluated via PCK metric on the LWIR "Hosp" data from the test subject and the overall accuracy (averaged over all 14 limbs) is shown in FIG. 9. It is evident that even under the strict PCK0.1 standard, our fine-tuned hg-trans model still keeps a 94.6% overall performance. To further evaluate the influence introduced by the physical hyperparameters, $\alpha c$ and $\beta c$, we not only evaluated the pose estimation performance over the whole "Hosp" test dataset, but also over each cover condition separately. As anticipated, uncovered cases show better performance as it keeps real human profile without any physical intervention.

To compare the pose estimation performance of our hg-trans model with the original hg model, we tested the pre-trained hg model on the RGB and LWIR "Hosp" test dataset as shown in FIG. 9. Results show that pre-trained hg model has poor performance in both RGB and LWIR test cases with 38% and 31% total accuracy at PCK0.1, respectively. This reveals that in this application, the domain shift and physical intervention both have significant effects on the human pose estimation accuracy. This is also shown in the uncover RGB case that original hg still keep a good performance when there is no domain shift and physical interventions. In comparison, our model tuned via UCITD shows consistent performance for all cover conditions, which is in compliance with Lemma 1 that LWIR imaging is strongly conditioned on covered entity pose and appearance. Therefore, our physics guided approach that combines datasets in proper modality and model transfer learning proves to be much more effective in solving the long-lasting problem of in-bed pose estimation. This performance can be further improved by a fine tuning strategy.

Domain Adaptation Evaluation

Figure 10:
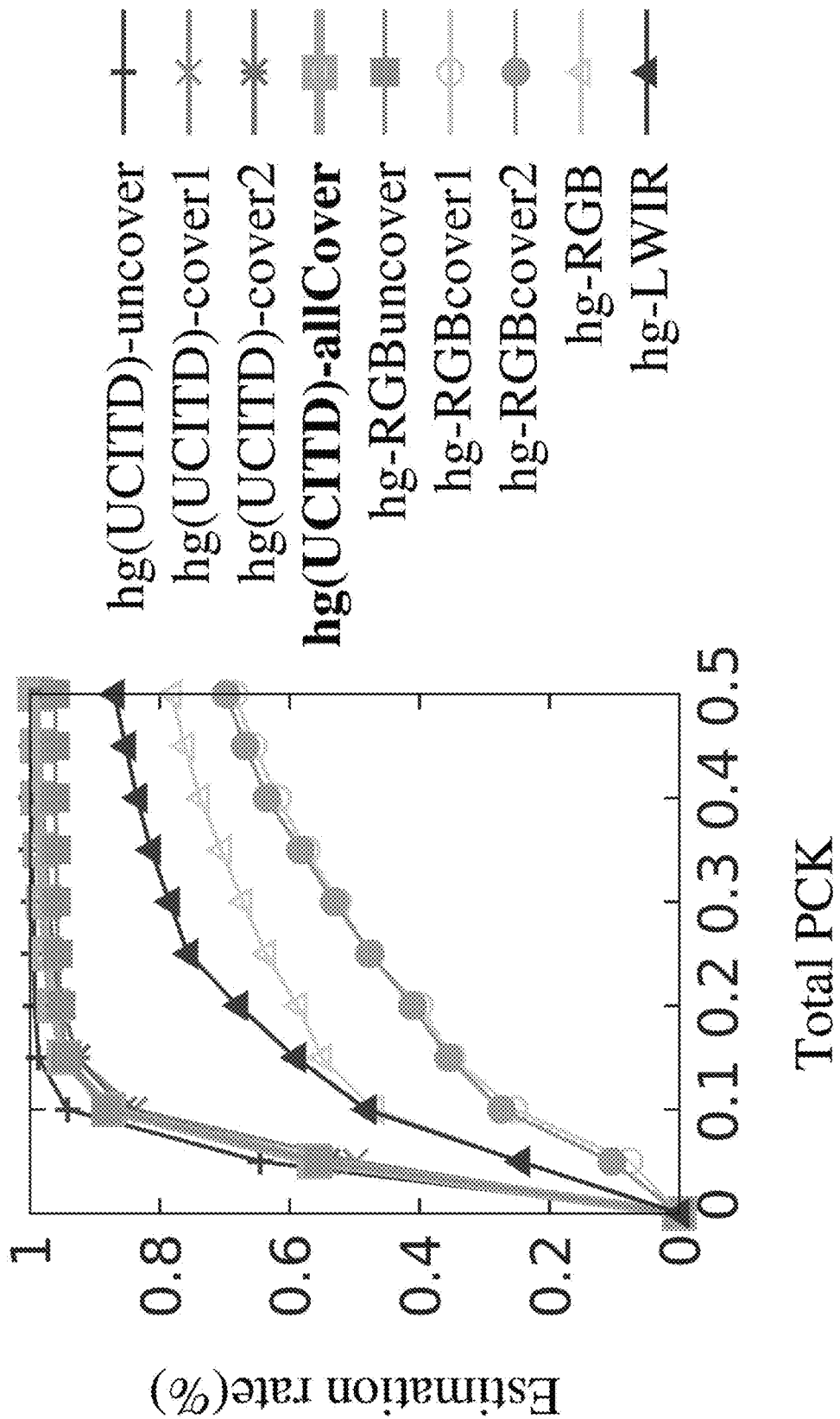
FIG. 10 shows PCK evaluation of in-bed pose estimation models tested on data from "Room" setting with different cover conditions.

Many datasets for healthcare applications are collected in extremely controlled environments, which limit their learning transferability to the real life settings due to the gap between simulated and real-world data distributions (i.e., the domain shift). With this consideration, to reveal the true performance of our technique in a practical application, we simulated a new deployment scenario by resetting up the whole system in a regular living room. We intentionally altered all of the environment hyperparameters from the hospital room setting by: (1) using a common twin size metal bed frame with middle firmness spring mattress completely different from the hospital bed and mattress; (2) repurchasing all covers to alter the cover appearance ac; (3) collecting data from a new subject who has never been in our pilot "Hosp" study to introduce a new at; and (4) having different bed and room height, which introduced a varied target distance from camera. We believe these are the most possibly changed parameters that can be seen in a real application. With a test dataset collected under this new setting called "Room", our hg-trans model still showed 87.9% pose estimation performance over strict PCK0.1 standard as shown in FIG. 10. The accuracy drop is anticipated as our pilot "Hosp" dataset covers only sparse at and ac samples to be fully generalizable to the new setting.

Comparison with PM-Based Pose Estimation

Figure 11B:
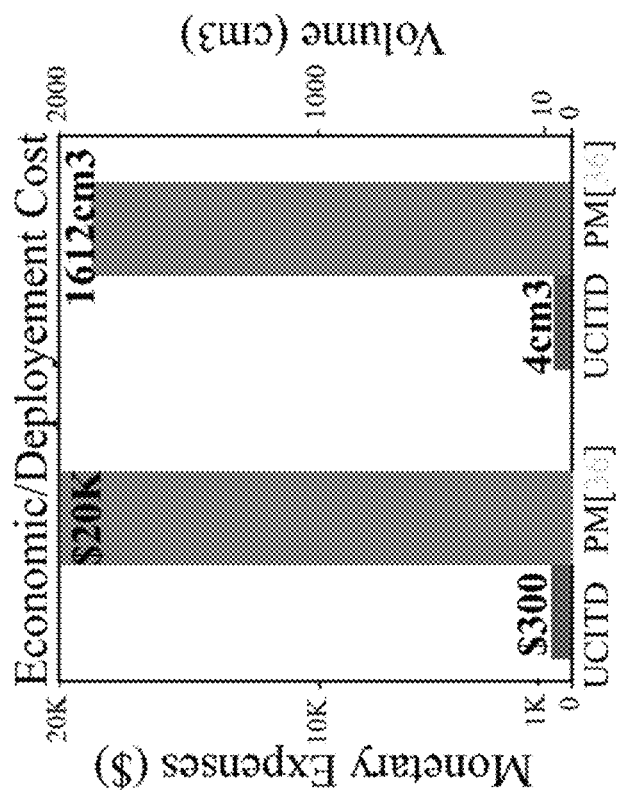
FIGS. 11A and 11B are graphs showing a comparison between the UCITD and the PM-based pose estimation model presented in [36].
Figure 11A:
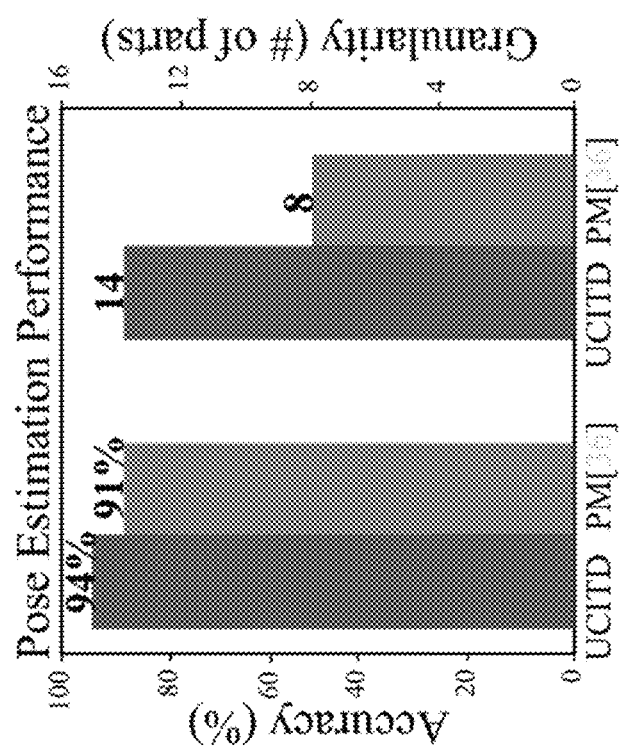

We also compared the performance and cost of our UCITD method with the only in-bed pose estimation technique that has been shown to be effective in real fully covered in-bed pose cases, which is the pressure mapping (PM)-based method. Nonetheless, many of the PM-based methods are still limited to categorizing rough postures (e.g., supine, left, and right sides) rather than granular pose estimation [18, 44]. Yet, there are few works that use PM for full pose estimation including the work by Ostadabbas et al. [36], which employed a Gaussian mixture model for full body limb identification. To compare the pose estimation performance of UCITD with the PM method in [36], besides pose estimation accuracy, the recognizable pose granularity is also an important factor. With close accuracy performance as shown in FIG. 11A, our method shows higher granularity recognition ability with more joints being detected (14 vs. 8). Furthermore, authors in [36] evaluated accuracy via visual inspection for overlapping area, while UCITD employs PCK quantitative metric at strict level PCK0.1, which is commonly used for granular human pose estimation [3, 19].

Besides pose estimation performance, we further evaluated the cost efficiency of UCITD against [36]. We used a FLIR camera with 120×160 resolution. For equivalent resolution, we choose TekScan [7] full body pressure measurement system with 192×84 sensor resolution. The price and space cost comparison is shown in FIG. 11B. As shown, our UCITD approach achieves tremendous cost efficiency, which is 60 times cheaper and 300 times smaller compared to the most advanced PM-based body monitoring approach. Furthermore, UCITD as a contactless method has much easier maintenance than PM-base approaches, which are prone to failure due to pressure sensors drift over time. Due to the small form factor of the UCITD technology, it can be mounted unobtrusively in any indoor environment to be used in long-term in-bed pose monitoring applications.

Computer Implementation

Figure 12:
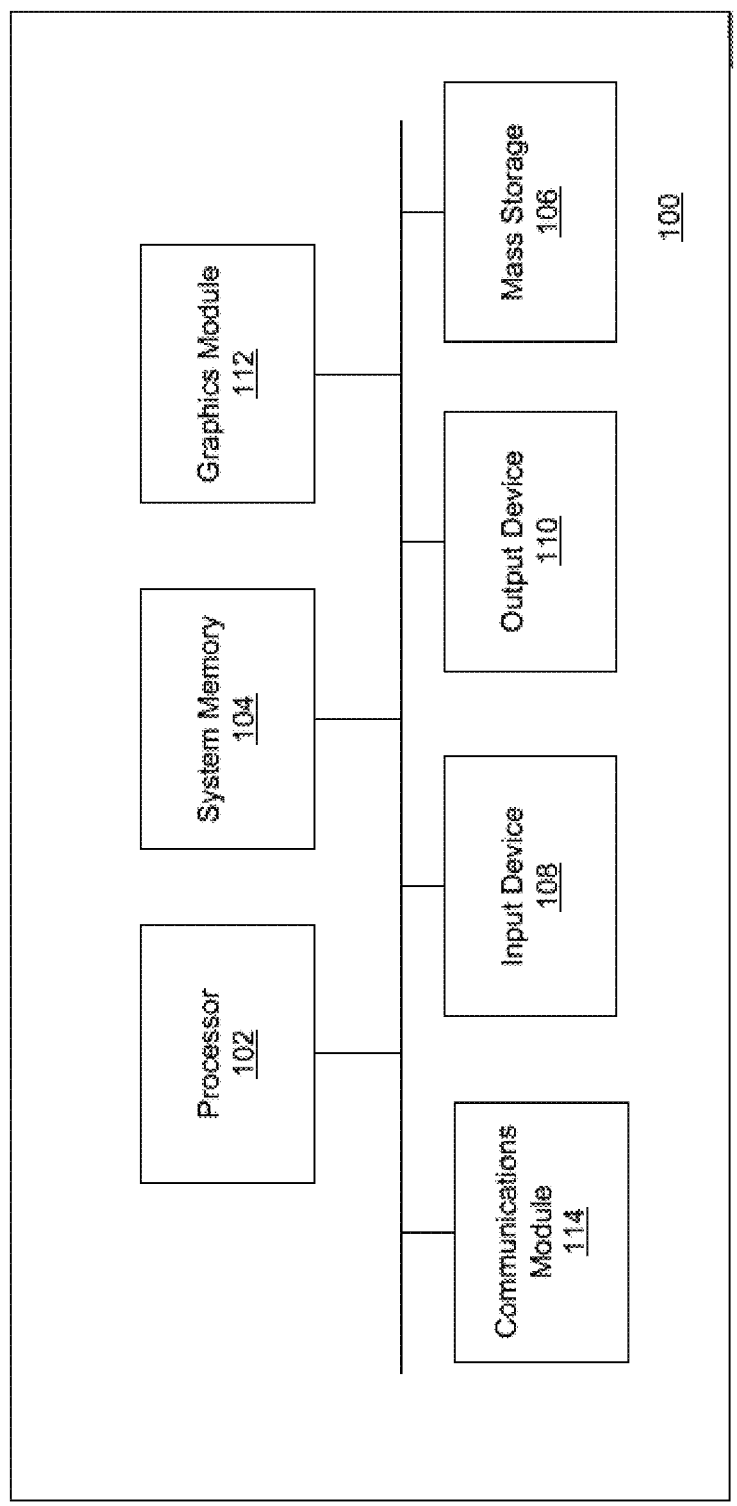
FIG. 12 is a simplified block diagram illustrating an exemplary computer system for processing thermal imaging data from a long wavelength infrared camera to estimate the pose of the human subject in accordance with one or more embodiments.

The methods, operations, modules, and systems described herein for estimating pose from thermal imaging data may be implemented in one or more computer programs executing on a programmable computer system. FIG. 12 is a simplified block diagram illustrating an exemplary computer system 100, on which the computer programs may operate as a set of computer instructions. The computer system 100 includes at least one computer processor 102, system memory 104 (including a random access memory and a read-only memory) readable by the processor 102. The computer system 100 also includes a mass storage device 106 (e.g., a hard disk drive, a solid-state storage device, an optical disk device, etc.). The computer processor 102 is capable of processing instructions stored in the system memory or mass storage device. The computer system 100 additionally includes input/output devices 108, 110 (e.g., a display, keyboard, pointer device, etc.), and a graphics module 112 for generating graphical objects.

Each computer program can be a set of instructions or program code in a code module resident in the random access memory of the computer system. Until required by the computer system, the set of instructions may be stored in the mass storage device or on another computer system and downloaded via the Internet or other network.

Other computer systems are also possible. For example, the computer system may comprise one or more physical machines, or virtual machines running on one or more physical machines. In addition, the computer system may comprise a cluster of computers or numerous distributed computers that are connected by the Internet or another network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions.

Accordingly, the foregoing description and attached drawings are by way of example only, and are not intended to be limiting.

REFERENCES

[1] M. Abouzari, A. Rashidi, J. Rezaii, K. Esfandiari, M. Asadollahi, H. Aleali, and M. Abdollahzadeh. The role of postoperative patient posture in the recurrence of traumatic chronic subdural hematoma after burr-hole surgery. *Neuro-surgery*, 61(4):794-797, 2007. 1

[2] F. Achilles, A.-E. Ichim, H. Coskun, F. Tombari, S. Noachtar, and N. Navab. Patient mocap: human pose estimation under blanket occlusion for hospital monitoring applications. *In International Conference on Medical Image Computing and Computer Assisted Intervention*, pages 491-499. Springer, 2016. 2, 3

[3] M. Andriluka, L. Pishchulin, P. Gehler, and B. Schiele. 2d human pose estimation: New benchmark and state of the art analysis. *Proceedings of the IEEE Conference on Computer Vision and Pattern Recognition*, pages 3686-3693, 2014. 2, 7, 8

[4] G. Atkinson and D. Davenne. Relationships between sleep, physical activity and human health. *Physiology & behavior*, 90(2-3):229-235, 2007. 1

[5] C. M. Bishop et al. *Neural networks for pattern recognition*. Oxford university press, 1995. 5

[6] J. Black, M. M. Baharestani, J. Cuddigan, B. Dorner, L. Edsberg, D. Langemo, M. E. Posthauer, C. Ratliff, G. Taler, et al. National pressure ulcer advisory panel's updated pressure ulcer staging system. *Advances in skin & wound care*, 20(5):269-274, 2007. 1

[7] B. P. M. S. (BPMS). https://www.tekscan.com/products-solutions/systems/body-pressure-measurement-system-bpms. 2018. 8

[8] H. Caesar, J. R. R. Uijlings, and V. Ferrari. Cocostuff: Thing and stuff classes in context. CoRR, abs/1612.03716, 2016. 2

[9] K. Chen, P. Gabriel, A. Alasfour, C. Gong, W. K. Doyle, O. Devinsky, D. Friedman, P. Dugan, L. Melloni, T. Thesen, et al. Patient-specific pose estimation in clinical environments. *IEEE Journal of Translational Engineering in Health and Medicine*, 2018. 2

[10] X. Chu, W. Yang, W. Ouyang, C. Ma, A. L. Yuille, and X. Wang. Multicontext attention for human pose estimation. *arXiv preprint arXiv:*1702.07432, 1(2), 2017. 1, 2
[11] N. Dalal and B. Triggs. Histograms of oriented gradients for human detection. 2005 *IEEE Computer Society Conference on Computer Vision and Pattern Recognition (CVPR '05)*, 1:886-893, 2005. 3
[12] J.-R. Ding. Bed status detection for elder-care center. In 2009 *16th International Conference on Systems, Signals and Image Processing*, pages 1-4. IEEE, 2009. 2
[13] D. Fink and S. Glick. Misinformation among physicians about dangers of fetal x-ray exposure. *Harefuah*, 124(11):717-9, 1993. 3
[14] J. B. Fowlkes and C. Holland. Mechanical bioeffects from diagnostic ultrasound: Aium consensus statements. american institute of ultrasound in medicine. *Journal of Ultrasound in Medicine*, 19(2):69-72, 2000. 3
[15] J. Fraden. *Handbook of modern sensors: physics, designs, and applications*. Springer Science & Business Media, 2004. 2, 4
[16] R. Gonzalez and R. Woods. *Digital image processing*. 2002. 2, 3
[17] R. I. Hartley and A. Zisserman. *Multiple View Geometry in Computer Vision*. Cambridge University Press, ISBN: 0521540518, second edition, 2004. 6
[18] M. Heydarzadeh, M. Nourani, and S. Ostadabbas. In-bed posture classification using deep autoencoders. In *Engineering in Medicine and Biology Society (EMBC), 2016 IEEE 38th Annual International Conference of the*, pages 3839-3842. IEEE, 2016. 8
[19] S. Johnson and M. Everingham. Clustered pose and nonlinear appearance models for human pose estimation. *BMVC*, 2:5, 2010. 2, 8
[20] D. Kondepudi and I. Prigogine. *Modern thermodynamics: from heat engines to dissipative structures*. John Wiley & Sons, 2014. 4
[21] Y. LeCun, Y. Bengio, and G. Hinton. Deep learning. *Nature*, 521(7553):436-444, 2015.
[22] B. Lee. Theoretical prediction and measurement of the fabric surface apparent temperature in a simulated man/ fabric/environment system. Technical report, DEFENCE SCIENCE AND TECHNOLOGY ORGANISATION MELBOURNE (AUSTRALIA), 1999. 4
[23] C. H. Lee, D. K. Kim, S. Y. Kim, C. S. Rhee, and T. B. Won. Changes in site of obstruction in obstructive sleep apnea patients according to sleep position: a dise study. *The Laryngoscope*, 125(1):248-254, 2015. 1
[24] J. H. Lienhard. *A heat transfer textbook*. Courier Corporation, 2013. 4
[25] J. J. Liu, M. C. Huang, W. Xu, and M. Sarrafzadeh. Body-part localization for pressure ulcer prevention. 2014 *36th Annual International Conference of the IEEE Engineering in Medicine and Biology Society*, pages 766-769, 2014. 1
[26] S. Liu and S. Ostadabbas. Inner space preserving generative pose machine. In *Proceedings of the European Conference on Computer Vision (ECCV)*, pages 718-735, 2018. 3,
[27] S. Liu, Y. Yin, and S. Ostadabbas. In-bed pose estimation: Deep learning with shallow dataset. *arXiv preprint arXiv:*1711.01005, 2017. 2, 3
[28] D. G. Lowe. Distinctive image features from scale invariant keypoints. *International journal of computer vision*, 60(2):91-110, 2004. 3
[29] J. Luo and D. Crandall. Color object detection using spatial color joint probability functions. *IEEE Transactions on Image Processing*, 15(6):1443-1453, 2006. 3

[30] M. Martinez, L. Rybok, and R. Stiefelhagen. Action recognition in bed using bams for assisted living and elderly care. In *Machine Vision Applications (MVA), 2015 14th IAPR International Conference on*, pages 329-332. IEEE, 2015. 2, 3, 4
[31] M. Martinez, B. Schauerte, and R. Stiefelhagen. bam! depth-based body analysis in critical care. In *International Conference on Computer Analysis of Images and Patterns*, pages 465-472. Springer, 2013. 2, 3, 4
[32]. J. McCabe, A. Gupta, D. E. Tate, and J. Myers. Preferred sleep position on the side is associated with carpal tunnel syndrome. *Hand*, 6(2):132-137, 2011. 1
[33] S. J. McCabe and Y. Xue. Evaluation of sleep position as a potential cause of carpal tunnel syndrome: preferred sleep position on the side is associated with age and gender. *Hand*, 5(4):361-363, 2010. 1
[34] A. Newell, K. Yang, and J. Deng. Stacked hourglass networks for human pose estimation. In *European Conference on Computer Vision*, pages 483-499. Springer, 2016. 1, 2, 7
[35] A. Oksenberg and D. S. Silverberg. The effect of body posture on sleep-related breathing disorders: facts and therapeutic implications. *Sleep medicine reviews*, 2(3): 139-162, 1998. 1
[36] S. Ostadabbas, M. Pouyan, M. Nourani, and N. Kehtarnavaz. In-bed posture classification and limb identification. 2014 *IEEE Biomedical Circuits and Systems Conference (BioCAS) Proceedings*, pages 133-136, 2014. 1, 8
[37] M. B. Pouyan, S. Ostadabbas, M. Farshbaf, R. Yousefi, M. Nourani, and M. Pompeo. Continuous eight-posture classification for bed-bound patients. 2013 *6th International Conference on Biomedical Engineering and Informatics*, pages 121-126, 2013. 1
[38] E. Sheiner, R. Hackmon, I. Shoham Vardi, X. Pombar, M. Hussey, H. Strassner, and J. Abramowicz. A comparison between acoustic output indices in 2d and 3d/4d ultrasound in obstetrics. *Ultrasound in Obstetrics and Gynecology: The Official Journal of the International Society of Ultrasound in Obstetrics and Gynecology*, 29(3):326-328, 2007. 3
[39] R. Szeliski. *Computer vision: algorithms and applications*. Springer Science & Business Media, 2010. 6
[40] R. Szeliski and H.-Y. Shum. Creating full view panoramic image mosaics and environment maps. In *Proceedings of the 24th annual conference on Computer graphics and interactive techniques*, pages 251-258. ACM Press/Addison-Wesley Publishing Co., 1997. 6
[41] W. Tang, P. Yu, and Y. Wu. Deeply learned compositional models for human pose estimation. In *The European Conference on Computer Vision (ECCV)*, September 2018. 1, 2
[42] S. E. Wei, V. Ramakrishna, T. Kanade, and Y. Sheikh. Convolutional pose machines. *Proceedings of the IEEE Conference on Computer Vision and Pattern Recognition*, pages 4724-4732, 2016. 1
[43] T. Xiang, G. S. Xia, and L. Zhang. Image stitching with perspective-preserving warping. *arXiv preprint arXiv:* 1605.05019, 2016. 6
[44] X. Xu, F. Lin, A. Wang, C. Song, Y. Hu, and W. Xu. On-bed sleep posture recognition based on body-earth mover's distance. In *Biomedical Circuits and Systems Conference (BioCAS)*, 2015 IEEE, pages 1-4. IEEE, 2015. 8
[45] M. C. Yu, H. Wu, J. L. Liou, M. S. Lee, and Y. P. Hung. Multiparameter sleep monitoring using a depth camera. In

*International Joint Conference on Biomedical Engineering Systems and Technologies*, pages 311-325. Springer, 2012. 2, 4

The invention claimed is:

1. A non-contact method of estimating an in-bed human pose, comprising the steps of:
    (a) capturing thermal imaging data of a human subject lying on a bed using a long wavelength infrared camera positioned above the human subject;
    (b) transmitting the thermal imaging data to a computer system; and
    (c) processing the thermal imaging data by the computer system using a model to estimate the pose of the human subject, said model comprising a machine learning inference model trained on a training dataset of a plurality of in-bed human poses, wherein the machine learning inference model is a supervised model, and the training dataset of the plurality of in-bed human poses comprises labeled poses.

2. The method of claim 1, wherein the human subject lying on the bed is at least partially under a cover when the thermal imaging data is captured in step (a).

3. The method of claim 1, wherein the human subject lying on the bed is uncovered when the thermal imaging data is captured in step (a).

4. The method of claim 1, wherein the human subject lying on the bed is in a dark space when the thermal imaging data is captured in step (a).

5. The method of claim 1, wherein the human subject lying on the bed is in a lighted space when the thermal imaging data is captured in step (a).

6. The method of claim 1, wherein the labeled poses are annotated based on images from a visible light camera positioned adjacent to the long wavelength infrared camera, wherein said images from the visible light camera are captured simultaneously with the thermal imaging data.

7. The method of claim 1, wherein the machine learning inference model comprises a stacked hourglass network.

8. The method of claim 1, further comprising repeating steps (a), (b), and (c) a plurality of times to estimate a series of poses and to determine movement of the human subject over a period of time.

9. A system for estimating a pose of a human subject lying on a bed, comprising:
    a long wavelength infrared camera positioned above the human subject for capturing thermal imaging data of the human subject lying on the bed; and
    a computer system coupled to the long wavelength infrared camera, the computer system comprising at least one processor, memory associated with the at least one processor, and a program supported in the memory containing a plurality of instructions which, when executed by the at least one processor, cause the at least one processor to receive the thermal imaging data and process the thermal imaging data using a model to estimate the pose of the human subject, said model comprising a machine learning inference model trained on a training dataset of a plurality of in-bed human poses, wherein the machine learning inference model is a supervised model, and the training dataset of the plurality of in-bed human poses comprises labeled poses.

10. The system of claim 9, wherein the human subject lying on the bed is at least partially under a cover when the thermal imaging data is captured by the long wavelength infrared camera.

11. The system of claim 9, wherein the human subject lying on the bed is uncovered when the thermal imaging data is captured by the long wavelength infrared camera.

12. The system of claim 9, wherein the human subject lying on the bed is in a dark space when the thermal imaging data is captured by the long wavelength infrared camera.

13. The system of claim 9, wherein the human subject lying on the bed is in a lighted space when the thermal imaging data is captured by the long wavelength infrared camera.

14. The method of claim 9, further comprising a visible light camera positioned adjacent to the long wavelength infrared camera capturing visible light images simultaneously with the thermal imaging data for use in annotating the labeled poses.

15. The system of claim 9, wherein the machine learning inference model comprises a stacked hourglass network.

16. The system of claim 9, wherein the computer system receives and processes thermal imaging data a plurality of times to estimate a series of poses and to determine movement of the human subject over a period of time.

* * * * *